(12) United States Patent
Yang et al.

(10) Patent No.: US 9,596,675 B2
(45) Date of Patent: Mar. 14, 2017

(54) METHOD AND DEVICE FOR SENDING HYBRID AUTOMATIC REPEAT REQUEST ACKNOWLEDGE INFORMATION

(75) Inventors: Weiwei Yang, Shenzhen (CN); Bo Dai, Shenzhen (CN); Bin Yu, Shenzhen (CN); Chunli Liang, Shenzhen (CN); Shuqiang Xia, Shenzhen (CN)

(73) Assignee: ZTE CORPORATION (CN)

( * ) Notice: Subject to any disclaimer, the term of this patent is extended or adjusted under 35 U.S.C. 154(b) by 67 days.

(21) Appl. No.: 14/369,689

(22) PCT Filed: Mar. 9, 2012

(86) PCT No.: PCT/CN2012/072157
§ 371 (c)(1),
(2), (4) Date: Jun. 28, 2014

(87) PCT Pub. No.: WO2013/097349
PCT Pub. Date: Jul. 4, 2013

(65) Prior Publication Data
US 2014/0362746 A1    Dec. 11, 2014

(30) Foreign Application Priority Data

Dec. 31, 2011 (CN) .......................... 2011 1 0459778

(51) Int. Cl.
*H04W 4/00* (2009.01)
*H04W 72/04* (2009.01)
(Continued)

(52) U.S. Cl.
CPC ........... *H04W 72/0413* (2013.01); *H04J 3/00* (2013.01); *H04L 1/1861* (2013.01); *H04L 5/0055* (2013.01)

(58) Field of Classification Search
None
See application file for complete search history.

(56) References Cited

U.S. PATENT DOCUMENTS 8,867,384 B2 * 10/2014 Astely .................. H04L 1/1635
370/252
2009/0196204 A1 * 8/2009 Astely .................. H04L 1/1635
370/280
(Continued)

FOREIGN PATENT DOCUMENTS

CN       101924624 A    12/2010
CN       102142941 A    8/2011
(Continued)

OTHER PUBLICATIONS

International Search Report corresponding to International Application No. PCT/CN/2012/072157, mailed Oct. 18, 2012.
(Continued)

*Primary Examiner* — Bob Phunkulh
(74) *Attorney, Agent, or Firm* — McAndrews, Held & Malloy, Ltd.

(57) ABSTRACT

Disclosed are a method and device for sending hybrid automatic repeat request acknowledge information. The method includes: in a TDD system, configuring a terminal to employ a PUCCH format 1b with channel selection method to send HARQ-ACK information; bundling the HARQ-ACK information of downlink subframes of serving cells in a bundling window corresponding to a specified uplink subframe to obtain HARQ-ACK information to be sent by the serving cells; and sending the HARQ-ACK information over an uplink subframe via the PUCCH or PUSCH. By way of bundling the HARQ-ACK information of downlink subframes of serving cells in a bundling window corresponding to a specified uplink subframe, the disclosure can realize sending the HARQ-ACK information when serving cells with different uplink and downlink configurations are aggregated.

23 Claims, 6 Drawing Sheets

(51) Int. Cl.
  *H04L 1/18* (2006.01)
  *H04J 3/00* (2006.01)
  *H04L 5/00* (2006.01)

(56) References Cited

U.S. PATENT DOCUMENTS

| | | | | |
|---|---|---|---|---|
| 2010/0291937 A1* | 11/2010 | Hu | ............... | H04L 1/1854 455/450 |
| 2011/0176443 A1* | 7/2011 | Astely | ............... | H04L 1/1607 370/252 |
| 2011/0268053 A1* | 11/2011 | Che | ............... | H04L 1/1621 370/329 |
| 2012/0044841 A1* | 2/2012 | Chen | ............... | H04B 7/155 370/279 |
| 2012/0106408 A1* | 5/2012 | Papasakellariou | .... | H04L 1/1614 370/280 |
| 2013/0170407 A1* | 7/2013 | Liang | ............... | H04L 1/1607 370/280 |
| 2013/0223301 A1* | 8/2013 | Lee | ............... | H04L 5/0055 370/281 |

FOREIGN PATENT DOCUMENTS

| | | |
|---|---|---|
| CN | 102164414 A | 8/2011 |
| TW | 201115968 A1 | 5/2011 |
| WO | 2011041623 A1 | 4/2011 |
| WO | 2011156967 A1 | 12/2011 |
| WO | 2011156967 A8 | 12/2011 |
| WO | 2011156967 A9 | 12/2011 |

OTHER PUBLICATIONS

Communication and Supplemental European Search Report corresponding to European Application No. EP 12861235, Jul. 16, 2015.
LG Electronics, ACKINACK piggyback on PUSCH in TDD, 3GPP TSG RAN WG1 #63bis, Jan. 17-21, 2011.
Huawei, HiSilicon, Details on ACKINACK time domain bundling for TDD, 3GPP TSG RAN WG1 Meeting #64, Feb. 21-25, 2011.

* cited by examiner

METHOD AND DEVICE FOR SENDING HYBRID AUTOMATIC REPEAT REQUEST ACKNOWLEDGE INFORMATION

CROSS-REFERENCE TO RELATED APPLICATIONS/INCORPORATION BY REFERENCE

This application is a 371 of International Patent Application No. PCT/CN2012/072157, filed Mar. 9, 2012, which claims priority to Chinese Patent Application No. 201110459778.5, Dec. 31, 2011, entitled "Method and Device for Sending Hybrid Automatic Retransmission Request Acknowledge Information." The above-identified applications are hereby incorporated herein by reference in their entirety.

TECHNICAL FIELD

The disclosure relates to the field of communications, and in particular, relates to a method and device for sending hybrid automatic repeat request acknowledge information.

BACKGROUND

A radio frame in a Long Term Evolution (LTE) system includes a frame structure of a Frequency Division Duplex (FDD) mode and a frame structure of a Time Division Duplex (TDD) mode. FIG. 1 is a schematic diagram of a frame structure in the LTE/LTE-A FDD system according to related technology. As shown in FIG. 1, a radio frame of 10 ms consists of twenty time slots of which the length is 0.5 ms and the serial numbers are 0~19, and time slots 2i and 2i+1 form a subframe with the length being 1 ms. FIG. 2 is a schematic diagram of a frame structure in the LTE/LTE-A TDD system according to related technology. As shown in FIG. 2, a radio frame of 10 ms consists of two half frames with the length being 5 ms, wherein a half frame includes 5 subframes with the length being 1 ms, and subframe i is defined as two time slots 2i and 2i+1 with the length being 0.5 ms respectively. The uplink and downlink configurations supported by the TDD system are as shown in Table 1.

TABLE 1

Schematic table of uplink and downlink configurations supported by each subframe

| Uplink-downlink configur-ations | Period of downlink-uplink switch point | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In the table, for each subframe of a radio frame, "D" represents a subframe dedicated to downlink transmission; "U" represents a subframe dedicated to uplink transmission; and "S" represents a special subframe, including three parts, namely, a Downlink Pilot Time Slot (DwPTS), a Guard Period (GP), and an Uplink Pilot Time Slot (UpPTS).

The TDD supports uplink-downlink switching periods of 5 ms and 10 ms. If the period of the downlink to uplink switch point is 5 ms, the special subframe will exist in two half frames; and if the period of the downlink to uplink switch point is 10 ms, the special subframe only exists in the first half frame. Subframe 0 and subframe 5 and the DwPTS are always used for downlink transmission. The UpPTS and a subframe closely following the special subframe are dedicated to uplink transmission.

In a downlink Hybrid Automatic Repeat Request (HARQ) of the LTE system, when User Equipment (UE) does not have Physical Uplink Shared Channel (PUSCH) transmission, Hybrid Automatic Repeat Request Acknowledge (HARQ-ACK) information of a Physical Downlink Shared Channel (PDSCH) is transmitted via a Physical Uplink Control Channel (PUCCH); or else transmitted via the PUSCH.

In the LTE TDD system, since uplink subframes are not in one-to-one correspondence with downlink subframes, i.e. HARQ-ACK information fed back by a plurality of downlink subframes needs to be sent via a PUCCH channel of one uplink subframe, wherein a set of downlink subframes corresponding to one uplink subframe forms a "bundling window". There are two methods for sending the HARQ-ACK information as follows: one is bundling, and the core concept of this method is to perform a logic AND operation on the HARQ-ACK information of transport blocks corresponding to various downlink subframes to be fed back over the uplink subframe. If a downlink subframe includes 2 transport blocks, the UE needs to feed back HARQ-ACK information of 2 bits, and if each of the subframes only includes one transport block, the UE needs to feed back HARQ-ACK information of 1 bit. The other method is multiplexing, and this method mainly refers to a PUCCH format 1b with channel selection in the LTE. The core concept of this method is to use different PUCCH channels and different modulated symbols on the channels to represent different feedback states of downlink subframes to be fed back over the uplink subframe. If the downlink subframes include a plurality of transport blocks, a spatial logic AND (also referred to as spatial domain bundling) is first performed on the HARQ-ACK fed back by the plurality of transport blocks of the downlink subframes and then channel selection is performed, and then the HARQ-ACK is fed back using PUCCH format 1b.

The most significant characteristic of the LTE-A system compared to the LTE system is that the LTE-A system introduces the carrier aggregation technology, which aggregates the bandwidths of the LTE system so as to obtain a greater bandwidth. In a system with carrier aggregation introduced, aggregated carriers are referred to as Component Carriers (CCs), and are also referred to as a Serving cell. Meanwhile, the concepts of Primary Component Carrier/Cell (PCC/PCell) and Secondary Component Carrier/Cell (SCC/SCell) are also proposed. In the system with carrier aggregation, there are at least one primary serving cell and one or more secondary serving cells, wherein the primary serving cell is kept in an active state all the time. For the TDD system, in Rel-10 version, aggregation of serving cells with the same uplink and downlink configurations is merely supported.

In the LTE-A carrier aggregation system, when a base station configures a plurality of downlink serving cells for a UE, the UE needs to feed back HARQ-ACK information of corresponding codeword streams of the plurality of downlink serving cells. In LTE-A, when HARQ-ACK information is sent via a physical uplink control channel, two sending methods are defined as follows: a method applying PUCCH format 1b with channel selection, and a sending method based on DFT-s-OFDM. Since neither the sending method based on DFT-s-OFDM nor the channel structure thereof is the same as that of the PUCCH format 1/1a/1b/2/2a/2b, in the existing LTE-A protocol, such a structure is referred to as PUCCH format 3. For UE configured with a plurality of serving cells, if the UE can only support the aggregation of 2 serving cells at maximum, then when the UE is configured with a plurality of serving cells, the UE may use a PUCCH format 1b with channel selection method to send HARQ-ACK; and if the UE can support the aggregation of more than 2 serving cells, then when the UE is configured with a plurality of serving cells, a base station may further configure the UE whether to apply the PUCCH format 1b with channel selection method or to apply PUCCH format 3 to send the HARQ-ACK information via high-layer signalling.

In the LTE-A TDD system, when 2 serving cells are configured and a format 1b with channel selection method is applied to send HARQ-ACK information and the number of corresponding downlink subframes M=1, the HARQ-ACK information to be sent is ACK/NACK/DTX feedback regarding a PDCCH indicating SPS release or a transport block of each of the serving cells. When 2 serving cells are configured and a format 1b with channel selection method is applied to send HARQ-ACK information and the number of corresponding downlink subframes M=2, the HARQ-ACK information is an ACK/NACK/DTX response regarding a PDCCH indicating SPS release or a PDSCH of each of the serving cells, that is to say, if the PDSCH corresponds to 2 transport blocks, HARQ-ACK information of the PDSCH is obtained by performing spatial domain bundling on HARQ-ACK information of the 2 transport blocks. When 2 serving cells are configured and a format 1b with channel selection method is applied to send HARQ-ACK information and the number of corresponding downlink subframes M>2, HARQ-ACK information to be fed back by each of the serving cells is 2 bits at maximum, and is obtained by performing spatial domain bundling first and then time domain bundling on ACK/NACK/DTX responses of all the transport blocks of each of the serving cells. In the current protocol version, when 2 serving cells are configured and a format 1b with channel selection method is applied to send HARQ-ACK information and the number of corresponding downlink subframes M=3 or M=4, first spatial domain bundling and then time domain bundling are performed on ACK/NACK/DTX responses of all the transport blocks of the serving cells to obtain 2-bit HARQ-ACK information of each of the serving cells, and the obtained HARQ-ACK information is sent via a PUCCH or PUSCH according to the following means.

If the obtained HARQ-ACK information is sent via the PUCCH, according to the ACK/NACK/DTX responses after the spatial domain bundling of the ACK/NACK responses of all the transport blocks of the serving cells, PUCCH resources to be used for sending and b(0)b(1) to be sent are found from a corresponding mapping table and then are sent, wherein the mapping table is as shown in Table 2 and Table 3.

If the obtained HARQ-ACK information is sent via the PUSCH and there is no corresponding UL grant, according to the ACK/NACK/DTX responses after the spatial domain bundling of the ACK/NACK responses of all the transport blocks of the serving cells, coding input bits o(0), o(1), o(2), o(3) to be sent are found from the corresponding mapping table and then are sent.

TABLE 2

Mapping table when M = 3

| Primary serving cell | Secondary serving cell | Resource | Constellation point | Coding input bit |
|---|---|---|---|---|
| HARQ-ACK(0), HARQ-ACK(1), HARQ-ACK(2) | HARQ-ACK(0), HARQ-ACK(1), HARQ-ACK(2) | $n_{PUCCH}^{(1)}$ | b(0), b(1) | o(0), o(1), o(2), o(3) |
| ACK, ACK, ACK | ACK, ACK, ACK | $n_{PUCCH,1}^{(1)}$ | 1, 1 | 1, 1, 1, 1 |
| ACK, ACK, NACK/DTX | ACK, ACK, ACK | $n_{PUCCH,1}^{(1)}$ | 0, 0 | 1, 0, 1, 1 |
| ACK, NACK/DTX, any | ACK, ACK, ACK | $n_{PUCCH,3}^{(1)}$ | 1, 1 | 0, 1, 1, 1 |
| NACK/DTX, any, any | ACK, ACK, ACK | $n_{PUCCH,3}^{(1)}$ | 0, 1 | 0, 0, 1, 1 |
| ACK, ACK, ACK | ACK, ACK, NACK/DTX | $n_{PUCCH,0}^{(1)}$ | 1, 0 | 1, 1, 1, 0 |
| ACK, ACK, NACK/DTX | ACK, ACK, NACK/DTX | $n_{PUCCH,3}^{(1)}$ | 1, 0 | 1, 0, 1, 0 |
| ACK, NACK/DTX, any | ACK, ACK, NACK/DTX | $n_{PUCCH,0}^{(1)}$ | 0, 1 | 0, 1, 1, 0 |
| NACK/DTX, any, any | ACK, ACK, NACK/DTX | $n_{PUCCH,3}^{(1)}$ | 0, 0 | 0, 0, 1, 0 |
| ACK, ACK, ACK | ACK, NACK/DTX, any | $n_{PUCCH,2}^{(1)}$ | 1, 1 | 1, 1, 0, 1 |
| ACK, ACK, NACK/DTX | ACK, NACK/DTX, any | $n_{PUCCH,2}^{(1)}$ | 0, 1 | 1, 0, 0, 1 |
| ACK, NACK/DTX, any | ACK, NACK/DTX, any | $n_{PUCCH,2}^{(1)}$ | 1, 0 | 0, 1, 0, 1 |
| NACK/DTX, any, any | ACK, NACK/DTX, any | $n_{PUCCH,2}^{(1)}$ | 0, 0 | 0, 0, 0, 1 |
| ACK, ACK, ACK | NACK/DTX, any, any | $n_{PUCCH,1}^{(1)}$ | 1, 0 | 1, 1, 0, 0 |
| ACK, ACK, NACK/DTX | NACK/DTX, any, any | $n_{PUCCH,1}^{(1)}$ | 0, 1 | 1, 0, 0, 0 |
| ACK, NACK/DTX, any | NACK/DTX, any, any | $n_{PUCCH,0}^{(1)}$ | 1, 1 | 0, 1, 0, 0 |

TABLE 2-continued

Mapping table when M = 3

| Primary serving cell | Secondary serving cell | Resource | Constellation point | Coding input bit |
|---|---|---|---|---|
| NACK, any, any | NACK/DTX, any, any | $n_{PUCCH,0}^{(1)}$ | 0, 0 | 0, 0, 0, 0 |
| DTX, any, any | NACK/DTX, any, any | Not transmitted | | 0, 0, 0, 0 |

TABLE 3

Mapping table when M = 4

| Primary serving cell | Secondary serving cell | Resource | Constellation point | Coding input bit |
|---|---|---|---|---|
| HARQ-ACK(0), HARQ-ACK(1), HARQ-ACK(2), HARQ-ACK(3) | HARQ-ACK(0), HARQ-ACK(1), HARQ-ACK(2), HARQ-ACK(3) | $n_{PUCCH}^{(1)}$ | b(0), b(1) | o(0), o(1), o(2), o(3) |
| ACK, ACK, ACK, NACK/DTX | ACK, ACK, ACK, NACK/DTX | $n_{PUCCH,1}^{(1)}$ | 1, 1 | 1, 1, 1, 1 |
| ACK, ACK, NACK/DTX, any | ACK, ACK, ACK, NACK/DTX | $n_{PUCCH,1}^{(1)}$ | 0, 0 | 1, 0, 1, 1 |
| ACK, DTX, DTX, DTX | ACK, ACK, ACK, NACK/DTX | $n_{PUCCH,3}^{(1)}$ | 1, 1 | 0, 1, 1, 1 |
| ACK, ACK, ACK, ACK | ACK, ACK, ACK, NACK/DTX | $n_{PUCCH,3}^{(1)}$ | 1, 1 | 0, 1, 1, 1 |
| NACK/DTX, any, any, any | ACK, ACK, ACK, NACK/DTX | $n_{PUCCH,3}^{(1)}$ | 0, 1 | 0, 0, 1, 1 |
| (ACK, NACK/DTX, any, any), except for (ACK, DTX, DTX, DTX) | ACK, ACK, ACK, NACK/DTX | $n_{PUCCH,3}^{(1)}$ | 0, 1 | 0, 0, 1, 1 |
| ACK, ACK, ACK, NACK/DTX | ACK, ACK, NACK/DTX, any | $n_{PUCCH,0}^{(1)}$ | 1, 0 | 1, 1, 1, 0 |
| ACK, ACK, NACK/DTX, any | ACK, ACK, NACK/DTX, any | $n_{PUCCH,3}^{(1)}$ | 1, 0 | 1, 0, 1, 0 |
| ACK, DTX, DTX, DTX | ACK, ACK, NACK/DTX, any | $n_{PUCCH,0}^{(1)}$ | 0, 1 | 0, 1, 1, 0 |
| ACK, ACK, ACK, ACK | ACK, ACK, NACK/DTX, any | $n_{PUCCH,0}^{(1)}$ | 0, 1 | 0, 1, 1, 0 |
| NACK/DTX, any, any, any | ACK, ACK, NACK/DTX, any | $n_{PUCCH,3}^{(1)}$ | 0, 0 | 0, 0, 1, 0 |
| (ACK, NACK/DTX, any, any), except for (ACK, DTX, DTX, DTX) | ACK, ACK, NACK/DTX, any | $n_{PUCCH,3}^{(1)}$ | 0, 0 | 0, 0, 1, 0 |
| ACK, ACK, ACK, NACK/DTX | ACK, DTX, DTX, DTX | $n_{PUCCH,2}^{(1)}$ | 1, 1 | 1, 1, 0, 1 |
| ACK, ACK, ACK, NACK/DTX | ACK, ACK, ACK, ACK | $n_{PUCCH,2}^{(1)}$ | 1, 1 | 1, 1, 0, 1 |
| ACK, ACK, NACK/DTX, any | ACK, DTX, DTX, DTX | $n_{PUCCH,2}^{(1)}$ | 0, 1 | 1, 0, 0, 1 |
| ACK, ACK, NACK/DTX, any | ACK, ACK, ACK, ACK | $n_{PUCCH,2}^{(1)}$ | 0, 1 | 1, 0, 0, 1 |
| ACK, DTX, DTX, DTX | ACK, DTX, DTX, DTX | $n_{PUCCH,2}^{(1)}$ | 1, 0 | 0, 1, 0, 1 |
| ACK, DTX, DTX, DTX | ACK, ACK, ACK, ACK | $n_{PUCCH,2}^{(1)}$ | 1, 0 | 0, 1, 0, 1 |
| ACK, ACK, ACK, ACK | ACK, DTX, DTX, DTX | $n_{PUCCH,2}^{(1)}$ | 1, 0 | 0, 1, 0, 1 |
| ACK, ACK, ACK, ACK | ACK, ACK, ACK, ACK | $n_{PUCCH,2}^{(1)}$ | 1, 0 | 0, 1, 0, 1 |
| NACK/DTX, any, any, any | ACK, DTX, DTX, DTX | $n_{PUCCH,2}^{(1)}$ | 0, 0 | 0, 0, 0, 1 |
| NACK/DTX, any, any, any | ACK, ACK, ACK, ACK | $n_{PUCCH,2}^{(1)}$ | 0, 0 | 0, 0, 0, 1 |
| (ACK, NACK/DTX, any, any), except for (ACK, DTX, DTX, DTX) | ACK, DTX, DTX, DTX | $n_{PUCCH,2}^{(1)}$ | 0, 0 | 0, 0, 0, 1 |

TABLE 3-continued

Mapping table when M = 4

| Primary serving cell | Secondary serving cell | Resource | Constellation point | Coding input bit |
|---|---|---|---|---|
| (ACK, NACK/DTX, any, any), except for (ACK, DTX, DTX, DTX) | ACK, ACK, ACK, ACK | $n_{PUCCH,2}^{(1)}$ | 0, 0 | 0, 0, 0, 1 |
| ACK, ACK, ACK, NACK/DTX | NACK/DTX, any, any, any | $n_{PUCCH,1}^{(1)}$ | 1, 0 | 1, 1, 0, 0 |
| ACK, ACK, ACK, NACK/DTX | (ACK, NACK/DTX, any, any), except for (ACK, DTX, DTX, DTX) | $n_{PUCCH,1}^{(1)}$ | 1, 0 | 1, 1, 0, 0 |
| ACK, ACK, NACK/DTX, any | NACK/DTX, any, any, any | $n_{PUCCH,1}^{(1)}$ | 0, 1 | 1, 0, 0, 0 |
| ACK, ACK, NACK/DTX, any | (ACK, NACK/DTX, any, any), except for (ACK, DTX, DTX, DTX) | $n_{PUCCH,1}^{(1)}$ | 0, 1 | 1, 0, 0, 0 |
| ACK, DTX, DTX, DTX | NACK/DTX, any, any, any | $n_{PUCCH,0}^{(1)}$ | 1, 1 | 0, 1, 0, 0 |
| ACK, DTX, DTX, DTX | (ACK, NACK/DTX, any, any), except for (ACK, DTX, DTX, DTX) | $n_{PUCCH,0}^{(1)}$ | 1, 1 | 0, 1, 0, 0 |
| ACK, ACK, ACK, ACK | NACK/DTX, any, any, any | $n_{PUCCH,0}^{(1)}$ | 1, 1 | 0, 1, 0, 0 |
| ACK, ACK, ACK, ACK | (ACK, NACK/DTX, any, any), except for (ACK, DTX, DTX, DTX) | $n_{PUCCH,0}^{(1)}$ | 1, 1 | 0, 1, 0, 0 |
| NACK, any, any, any | NACK/DTX, any, any, any | $n_{PUCCH,0}^{(1)}$ | 0, 0 | 0, 0, 0, 0 |
| NACK, any, any, any | (ACK, NACK/DTX, any, any), except for (ACK, DTX, DTX, DTX) | $n_{PUCCH,0}^{(1)}$ | 0, 0 | 0, 0, 0, 0 |
| (ACK, NACK/DTX, any, any), except for (ACK, DTX, DTX, DTX) | NACK/DTX, any, any, any | $n_{PUCCH,0}^{(1)}$ | 0, 0 | 0, 0, 0, 0 |
| (ACK, NACK/DTX, any, any), except for (ACK, DTX, DTX, DTX) | (ACK, NACK/DTX, any, any), except for (ACK, DTX, DTX, DTX) | $n_{PUCCH,0}^{(1)}$ | 0, 0 | 0, 0, 0, 0 |
| DTX, any, any, any | NACK/DTX, any, any, any | Not transmitted | | 0, 0, 0, 0 |
| DTX, any, any, any | (ACK, NACK/DTX, any, any), except for (ACK, DTX, DTX, DTX) | Not transmitted | | 0, 0, 0, 0 |

In the discussion of subsequent versions, aggregation of serving cells with different uplink and downlink configurations needs to be supported. However, the existing format 1b with channel selection method is only applicable to the sending of HARQ-ACK information when serving cells with the same uplink and downlink configurations are aggregated, thus the sending of HARQ-ACK information when serving cells with different uplink and downlink configurations are aggregated cannot be realized.

SUMMARY

Provided in the disclosure are a method and device for sending hybrid automatic repeat request acknowledge information to solve at least the problem that the sending of HARQ-ACK information when serving cells with different uplink and downlink configurations are aggregated cannot be realized when configuring a PUCCH format 1b with channel selection method in related technology.

According to one aspect of the disclosure, a method for sending hybrid automatic repeat request acknowledge information is provided, including: in a Time Division Duplex (TDD) system, configuring a terminal to employ a Physical Uplink Control Channel (PUCCH) format 1b with channel selection method to send HARQ-ACK information; bundling HARQ-ACK information of downlink subframes of serving cells in a bundling window corresponding to a specified uplink subframe to obtain HARQ-ACK information to be sent by the serving cells; and sending the HARQ-ACK information over the uplink subframe via the PUCCH or a Physical Uplink Shard Channel (PUSCH).

Bundling the HARQ-ACK information of the downlink subframes of the serving cells in the bundling window corresponding to the specified uplink subframe to obtain the HARQ-ACK information to be sent by the serving cells includes: employing a same bundling operation to bundle the HARQ-ACK information of downlink subframes of each of the serving cells in the bundling window to obtain the HARQ-ACK information to be sent by each of the serving cells, wherein the number of bits of the HARQ-ACK information to be sent by each of the serving cells is the same.

The number of bits is 2.

Employing the same bundling operation to bundle the HARQ-ACK information of the downlink subframes of each of the serving cells in the bundling window includes: a bundling method of a serving cell with a smaller number of downlink subframes in the bundling window corresponding to the uplink subframe being the same as a bundling method of a serving cell with a larger number of downlink subframes corresponding to the uplink subframe.

The method for sending hybrid automatic repeat request acknowledge information is applied to a scenario where a terminal is configured to use carrier aggregation and uplink and downlink configurations of aggregated serving cells are different.

Bundling the HARQ-ACK information of the downlink subframes of the serving cells in the bundling window corresponding to the specified uplink subframe to obtain the HARQ-ACK information to be sent by the serving cells includes: bundling, according to the number of pieces of HARQ-ACK information of each of the serving cells, the HARQ-ACK information of each of the serving cells respectively to obtain HARQ-ACK information to be sent by each of the serving cells.

Bundling, according to the number of pieces of HARQ-ACK information of each of the serving cells, the HARQ-ACK information of each of the serving cells respectively to obtain the HARQ-ACK information to be sent by each of the serving cells includes: when the aggregated serving cells are a first serving cell and a second serving cell, the first serving cell corresponds to one downlink subframe and the second serving cell corresponds to two downlink subframes, performing spatial domain bundling on the HARQ-ACK information of the first serving cell and the second serving cell to obtain the HARQ-ACK information to be sent over the uplink subframe of the first serving cell and the second serving cell, wherein the total number of bits of the HARQ-ACK information to be sent by the first serving cell and the second serving cell is 3.

Bundling, according to the number of pieces of HARQ-ACK information of each of the serving cells, the HARQ-ACK information of each of the serving cells respectively to obtain the HARQ-ACK information to be sent by each of the serving cells includes: when the aggregated serving cells are a first serving cell and a second serving cell, the first serving cell corresponds to one downlink subframe and the second serving cell corresponds to two downlink subframes, only performing spatial domain bundling on the HARQ-ACK information of the second serving cell to obtain HARQ-ACK information to be sent over the uplink subframe of the first serving cell and the second serving cell, wherein when the maximum number of transport blocks supported by a PDSCH corresponding to a downlink transmission mode of the first serving cell is 2, the total number of bits of the HARQ-ACK information to be sent by the first serving cell and the second serving cell is 4, and when the maximum number of transport blocks supported by the PDSCH corresponding to the downlink transmission mode of the first serving cell is 1, the total number of bits of the HARQ-ACK information to be sent by the first serving cell and the second serving cell is 3.

Bundling, according to the number of pieces of HARQ-ACK information of each of the serving cells, the HARQ-ACK information of each of the serving cells respectively to obtain the HARQ-ACK information to be sent by each of the serving cells includes: when the aggregated serving cells are a first serving cell and a second serving cell, the first serving cell corresponds to one downlink subframe and the second serving cell corresponds to three downlink subframes, performing spatial domain bundling on the HARQ-ACK information of the first serving cell and the second serving cell to obtain HARQ-ACK information to be sent by the first serving cell and the second serving cell, wherein the total number of bits of the HARQ-ACK information to be sent by the first serving cell and the second serving cell is 4.

Bundling, according to the number of pieces of HARQ-ACK information of each of the serving cells, the HARQ-ACK information of each of the serving cells respectively to obtain the HARQ-ACK information to be sent by each of the serving cells includes: when the aggregated serving cells are a first serving cell and a second serving cell, the first serving cell corresponds to one downlink subframe and the second serving cell corresponds to three downlink subframes, performing spatial domain bundling on the HARQ-ACK information of the first serving cell, and performing spatial domain bundling and then time domain bundling on the HARQ-ACK information of the second serving cell to obtain HARQ-ACK information to be sent by the first serving cell and the second serving cell, wherein the total number of bits of the HARQ-ACK information to be sent by the first serving cell and the second serving cell is 3.

Bundling, according to the number of pieces of HARQ-ACK information of each of the serving cells, the HARQ-ACK information of each of the serving cells respectively to obtain the HARQ-ACK information to be sent by each of the serving cells includes: when the aggregated serving cells are a first serving cell and a second serving cell, the first serving cell corresponds to one downlink subframe and the second serving cell corresponds to three downlink subframes, only performing spatial domain bundling and then time domain bundling on the HARQ-ACK information of the second serving cell to obtain HARQ-ACK information to be sent by the first serving cell and the second serving cell, wherein when the maximum number of transport blocks supported by a PDSCH corresponding to a downlink transmission mode of the first serving cell is 2, the total number of bits of the HARQ-ACK information to be sent by the first serving cell and the second serving cell is 4, and when the maximum number of transport blocks supported by the PDSCH corresponding to the downlink transmission mode of the first serving cell is 1, the total number of bits of the HARQ-ACK information to be sent by the first serving cell and the second serving cell is 3.

Bundling, according to the number of pieces of HARQ-ACK information of each of the serving cells, the HARQ-ACK information of each of the serving cells respectively to obtain the HARQ-ACK information to be sent by each of the serving cells includes: when the aggregated serving cells are a first serving cell and a second serving cell, the first serving cell corresponds to one downlink subframe and the second serving cell corresponds to four downlink subframes, only performing spatial domain bundling and then time domain bundling on the HARQ-ACK information of the second serving cell to obtain HARQ-ACK information to be sent by the first serving cell and the second serving cell, wherein the total number of bits of the HARQ-ACK information to be sent by the first serving cell and the second serving cell is 3.

Bundling, according to the number of pieces of HARQ-ACK information of each of the serving cells, the HARQ-ACK information of each of the serving cells respectively to obtain the HARQ-ACK information to be sent by each of the serving cells includes: when the aggregated serving cells are a first serving cell and a second serving cell, the first serving cell corresponds to one downlink subframe and the second serving cell corresponds to four downlink subframes, only performing spatial domain bundling and then time domain bundling on the HARQ-ACK information of the second serving cell to obtain HARQ-ACK information to be sent by the first serving cell and the second serving cell, wherein when the maximum number of transport blocks supported by a PDSCH corresponding to a downlink transmission mode of the first serving cell is 2, the total number of bits of the HARQ-ACK information to be sent by the first serving cell and the second serving cell is 4, and when the maximum number of transport blocks supported by the PDSCH corresponding to the downlink transmission mode of the first serving cell is 1, the total number of bits of the HARQ-ACK information to be sent by the first serving cell and the second serving cell is 3.

Bundling, according to the number of pieces of HARQ-ACK information of each of the serving cells, the HARQ-ACK information of each of the serving cells respectively to obtain the HARQ-ACK information to be sent by each of the serving cells includes: when the aggregated serving cells are a first serving cell and a second serving cell, the first serving cell corresponds to one downlink subframe and the second serving cell corresponds to four downlink subframes, performing spatial domain bundling on the HARQ-ACK information of the first serving cell, and performing spatial domain bundling and then time domain bundling on the HARQ-ACK information of the second serving cell to obtain HARQ-ACK information to be sent by the first serving cell and the second serving cell, wherein the number of bits of HARQ-ACK information to be sent after the bundling on the second serving cell is 3, wherein the number of bits of HARQ-ACK information to be sent after the bundling on the second serving cell being 3 refers to: performing spatial domain bundling on one downlink subframe of the second serving cell while performing time domain bundling on the other downlink subframes apart from the downlink subframe of the second serving cell; the total number of bits of the HARQ-ACK information to be sent by the first serving cell and the second serving cell is 4.

Bundling, according to the number of pieces of HARQ-ACK information of each of the serving cells, the HARQ-ACK information of each of the serving cells respectively to obtain the HARQ-ACK information to be sent by each of the serving cells includes: when the aggregated serving cells are a first serving cell and a second serving cell, the first serving cell corresponds to one downlink subframe and the second serving cell corresponds to four downlink subframes, performing spatial domain bundling on the HARQ-ACK information of the first serving cell, and performing spatial domain bundling and then time domain bundling on the HARQ-ACK information of the second serving cell, wherein the number of bits of HARQ-ACK information to be sent after the bundling on the second serving cell is 3, the total number of bits of HARQ-ACK information to be sent by the first serving cell and the second serving cell is 4.

Bundling, according to the number of pieces of HARQ-ACK information of each of the serving cells, the HARQ-ACK information of each of the serving cells respectively to obtain the HARQ-ACK information to be sent by each of the serving cells includes: when the aggregated serving cells are a first serving cell and a second serving cell, the first serving cell corresponds to two downlink subframes and the second serving cell corresponds to three downlink subframes, performing spatial domain bundling on the HARQ-ACK information of the first serving cell, and performing spatial domain bundling and then time domain bundling on the HARQ-ACK information of the second serving cell to obtain HARQ-ACK information to be sent by the first serving cell and the second serving cell, wherein the total number of bits of the HARQ-ACK information to be sent by the first serving cell and the second serving cell is 4.

Bundling, according to the number of pieces of HARQ-ACK information of each of the serving cells, the HARQ-ACK information of each of the serving cells respectively to obtain the HARQ-ACK information to be sent by each of the serving cells includes: when the aggregated serving cells are a first serving cell and a second serving cell, the first serving cell corresponds to two downlink subframes and the second serving cell corresponds to four downlink subframes, performing spatial domain bundling on the HARQ-ACK information of the first serving cell, and performing spatial domain bundling and then time domain bundling on the HARQ-ACK information of the second serving cell to obtain HARQ-ACK information to be sent by the first serving cell and the second serving cell, wherein the total number of bits of the HARQ-ACK information to be sent by the first serving cell and the second serving cell is 4.

In the case where the maximum number of corresponding downlink subframes of the serving cell is greater than 2, the method of employing a same bundling operation to bundle the HARQ-ACK information of downlink subframes of each of the serving cells in the bundling window to obtain the HARQ-ACK information to be sent by each of the serving cells is employed, wherein the number of bits of the HARQ-ACK information to be sent by each of the serving cells is the same; and in the case where the maximum number of corresponding downlink subframes of the serving cell is equal to 2, the method of bundling, according to the number of pieces of HARQ-ACK information of each of the serving cells, the HARQ-ACK information of each of the serving cells respectively to obtain HARQ-ACK information to be sent by each of the serving cells is employed.

In the case where the minimum number of corresponding downlink subframes of the serving cell is greater than 1, the method of employing a same bundling operation to bundle the HARQ-ACK information of downlink subframes of each of the serving cells in the bundling window to obtain the HARQ-ACK information to be sent by each of the serving cells is employed, wherein the number of bits of the HARQ-ACK information to be sent by each of the serving cells is the same; and in the case where the minimum number of corresponding downlink subframes of the serving cell is equal to 1, the method of bundling, according to the number of pieces of HARQ-ACK information of each of the serving cells, the HARQ-ACK information of each of the serving cells respectively to obtain HARQ-ACK information to be sent by each of the serving cells is employed.

In the case where a channel used for sending the HARQ-ACK information is the PUCCH, the method of employing a same bundling operation to bundle the HARQ-ACK information of downlink subframes of each of the serving cells in the bundling window to obtain the HARQ-ACK information to be sent by each of the serving cells is employed, wherein the number of bits of the HARQ-ACK information to be sent by each of the serving cells is the same; and in the case where the channel used for sending the HARQ-ACK information is the PUSCH, the method of bundling, according to the number of pieces of HARQ-ACK information of each of the serving cells, the HARQ-ACK information of each of the serving cells respectively to obtain HARQ-ACK information to be sent by each of the serving cells is employed.

In the case where a channel used for sending the HARQ-ACK information is the PUCCH, the method of employing a same bundling operation to bundle the HARQ-ACK information of downlink subframes of each of the serving cells in the bundling window to obtain the HARQ-ACK information to be sent by each of the serving cells is employed, wherein the number of bits of the HARQ-ACK information to be sent by each of the serving cells is the same; in the case where the channel used for sending the HARQ-ACK information is the PUSCH and there is no corresponding DCI format 0/4, the method of employing a same bundling operation to bundle the HARQ-ACK information of downlink subframes of each of the serving cells in the bundling window to obtain the HARQ-ACK information to be sent by each of the serving cells is employed, wherein the number of bits of the HARQ-ACK information to be sent by each of the serving cells is the same; and in the case where the channel for sending the HARQ-ACK information is the PUSCH and there is a corresponding DCI format 0/4, the method of bundling, according to the number of pieces of HARQ-ACK information of each of the serving cells, the HARQ-ACK information of each of the serving cells respectively to obtain HARQ-ACK information to be sent by each of the serving cells is employed.

Sending the HARQ-ACK information via the PUCCH or the PUSCH includes one of the following: when sending via the PUCCH, concatenating the HARQ-ACK information of the serving cells into an HARQ-ACK information sequence according to a predefined order, and then employing a PUCCH format 1b with channel selection method to send the HARQ-ACK information sequence; and when sending via the PUSCH, concatenating the HARQ-ACK information of the serving cells into an HARQ-ACK information sequence according to a predefined order, and then sending the HARQ-ACK information sequence via the PUSCH.

The predefined order includes one of the following: an order of ascending serving cell indices; and an order of uplink and downlink configuration priorities of the serving cells.

According to one aspect of the disclosure, a device for sending hybrid automatic repeat request acknowledge (HARQ-ACK) information is provided, including: a bundling module, configured to, in a Time Division Duplex (TDD) system, in the case where a terminal is configured to employ a Physical Uplink Control Channel (PUCCH) format 1b with channel selection method to send HARQ-ACK information, bundle the HARQ-ACK information of downlink subframes of serving cells in a bundling window corresponding to a specified uplink subframe to obtain HARQ-ACK information to be sent by the serving cells; and a sending module, configured to send the HARQ-ACK information over an uplink subframe via the PUCCH or a Physical Uplink Shard Channel (PUSCH).

By way of bundling the HARQ-ACK information (also referred to as HARQ-ACK response, HARQ-ACK acknowledge information) of downlink subframes of serving cells in a bundling window corresponding to a specified uplink subframe, the disclosure can realize sending the HARQ-ACK information when serving cells with different uplink and downlink configurations are aggregated.

BRIEF DESCRIPTION OF THE DRAWINGS

Drawings, provided for further understanding of the disclosure and forming a part of the specification, are used to explain the disclosure together with embodiments of the disclosure rather than to limit the disclosure. In the drawings.

DETAILED DESCRIPTION OF THE EMBODIMENTS

Note that, the embodiments of the disclosure and the features of the embodiments can be combined with each other if there is no conflict. The disclosure will be explained below with reference to the drawings and in conjunction with the embodiments in detail.

Figure 1:
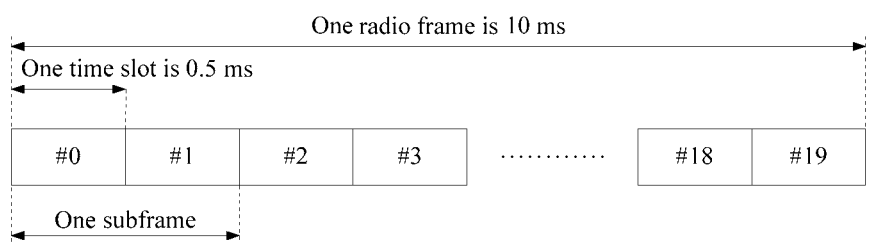
FIG. 1 is a schematic diagram of a frame structure in the LTE/LTE-A FDD system according to related technology.
Figure 2:
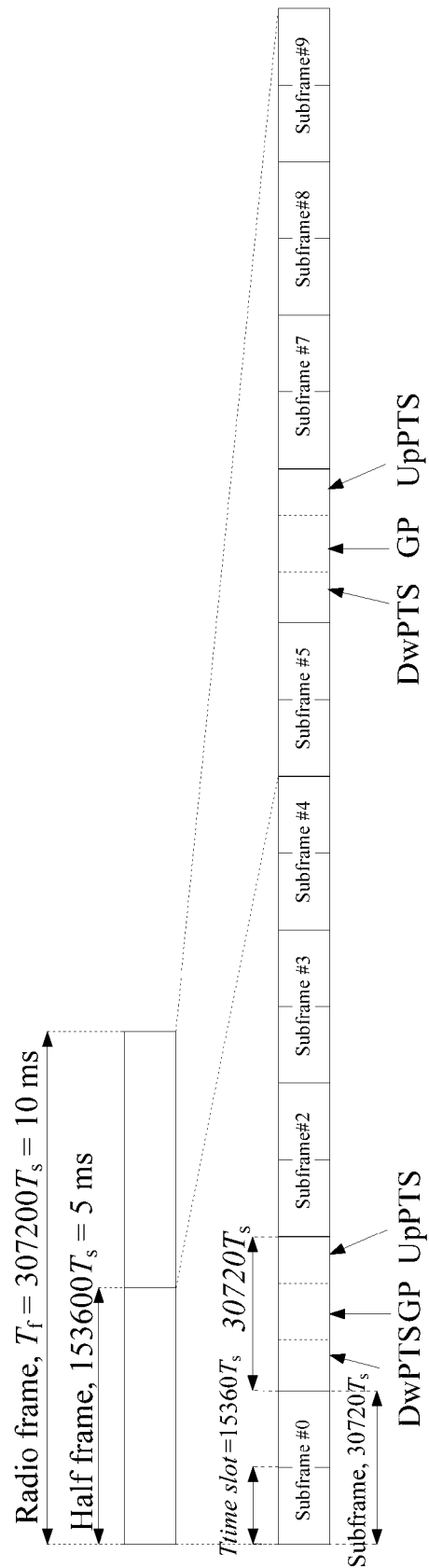
FIG. 2 is a schematic diagram of a frame structure in the LTE/LTE-A TDD system according to related technology.
Figure 3:
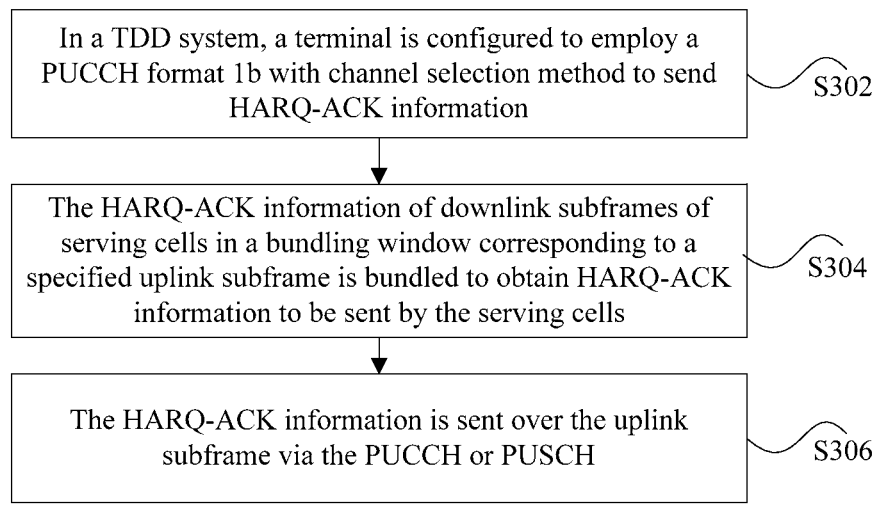
FIG. 3 is a flowchart of a method for sending hybrid automatic repeat request acknowledge information according to an embodiment of the disclosure.

The disclosure provides a method for sending hybrid automatic repeat request acknowledge information. FIG. 3 is a flowchart of a method for sending hybrid automatic repeat request acknowledge information according to an embodiment of the disclosure. As shown in FIG. 3, the method includes the following steps S302 to S306.

In step S302, in a TDD system, a terminal is configured to employ a PUCCH format 1b with channel selection method to send HARQ-ACK information.

In step S304, the HARQ-ACK information of downlink subframes of serving cells in a bundling window corresponding to a specified uplink subframe are bundled to obtain HARQ-ACK information to be sent by the serving cells.

In step S306, the HARQ-ACK information is sent over an uplink subframe via the PUCCH or PUSCH.

In related technology, the PUCCH format 1b with channel selection cannot send HARQ-ACK information when serving cells with different uplink and downlink configurations are aggregated. By way of bundling the HARQ-ACK information of downlink subframes of serving cells in a bundling window corresponding to a specified uplink subframe, the embodiment of the disclosure can realize sending the HARQ-ACK information when serving cells with different uplink and downlink configurations are aggregated.

Preferably, step S304 may be realized according to the following several methods.

Method I: the HARQ-ACK information of downlink subframes of each of the serving cells in a bundling window is bundled using the same bundling operation to obtain HARQ-ACK information to be sent by each of the serving cells, wherein the number of bits of the HARQ-ACK information to be sent by each of the serving cells is the same. It should be noted that the number of bits is 2.

It should be noted that employing the same bundling operation to bundle the HARQ-ACK information of the downlink subframes of each of the serving cells in the bundling window refers to: the bundling method of a serving cell with a smaller number of downlink subframes in the bundling window corresponding to the uplink subframe is the same as the bundling method of a serving cell with a larger number of downlink subframes corresponding to the uplink subframe.

Method II: according to the number of pieces of HARQ-ACK information of each of the serving cells, the HARQ-ACK information of each of the serving cells is bundled respectively to obtain HARQ-ACK information to be sent by each of the serving cells.

Method II includes the following several situations.

(1) When the aggregated serving cells are a first serving cell and a second serving cell, the first serving cell corresponds to one downlink subframe and the second serving cell corresponds to two downlink subframes, spatial domain bundling is performed on the HARQ-ACK information of the first serving cell and the second serving cell to obtain HARQ-ACK information to be sent by the uplink subframe of the first serving cell and the second serving cell, wherein the total number of bits of the HARQ-ACK information to be sent by the first serving cell and the second serving cell is 3.

(2) When the aggregated serving cells are a first serving cell and a second serving cell, the first serving cell corresponds to one downlink subframe and the second serving cell corresponds to two downlink subframes, spatial domain bundling is performed on the HARQ-ACK information of the second serving cell only to obtain HARQ-ACK information to be sent by the uplink subframe of the first serving cell and the second serving cell, wherein when the maximum number of transport blocks supported by a PDSCH corresponding to a downlink transmission mode of the first serving cell is 2, the total number of bits of the HARQ-ACK information to be sent by the first serving cell and the second serving cell is 4, and when the maximum number of transport blocks supported by the PDSCH corresponding to the downlink transmission mode of the first serving cell is 1, the total number of bits of the HARQ-ACK information to be sent by the first serving cell and the second serving cell is 3.

(3) When the aggregated serving cells are a first serving cell and a second serving cell, the first serving cell corresponds to one downlink subframe and the second serving cell corresponds to three downlink subframes, spatial domain bundling is performed on the HARQ-ACK information of the first serving cell and the second serving cell to obtain HARQ-ACK information to be sent by the first serving cell and the second serving cell, wherein the total number of bits of the HARQ-ACK information to be sent by the first serving cell and the second serving cell is 4.

(4) When the aggregated serving cells are a first serving cell and a second serving cell, the first serving cell corresponds to one downlink subframe and the second serving cell corresponds to three downlink subframes, spatial domain bundling is performed on the HARQ-ACK information of the first serving cell, and spatial domain bundling and then time domain bundling are performed on the HARQ-ACK information of the second serving cell to obtain HARQ-ACK information to be sent by the first serving cell and the second serving cell, wherein the total number of bits of the HARQ-ACK information to be sent by the first serving cell and the second serving cell is 3.

(5) When the aggregated serving cells are a first serving cell and a second serving cell, the first serving cell corresponds to one downlink subframe and the second serving cell corresponds to three downlink subframes, spatial domain bundling and then time domain bundling are performed on the HARQ-ACK information of the second serving cell only to obtain HARQ-ACK information to be sent by the first serving cell and the second serving cell, wherein when the maximum number of transport blocks supported by a PDSCH corresponding to a downlink transmission mode of the first serving cell is 2, the total number of bits of the HARQ-ACK information to be sent by the first serving cell and the second serving cell is 4, and when the maximum number of transport blocks supported by the PDSCH corresponding to the downlink transmission mode of the first serving cell is 1, the total number of bits of the HARQ-ACK information to be sent by the first serving cell and the second serving cell is 3.

(6) When the aggregated serving cells are a first serving cell and a second serving cell, the first serving cell corresponds to one downlink subframe and the second serving cell corresponds to four downlink subframes, spatial domain bundling and then time domain bundling are performed on the HARQ-ACK information of the second serving cell only to obtain HARQ-ACK information to be sent by the first serving cell and the second serving cell, wherein the total number of bits of the HARQ-ACK information to be sent by the first serving cell and the second serving cell is 3.

(7) When the aggregated serving cells are a first serving cell and a second serving cell, the first serving cell corresponds to one downlink subframe and the second serving cell corresponds to four downlink subframes, spatial domain bundling and then time domain bundling are performed on the HARQ-ACK information of the second serving cell only to obtain HARQ-ACK information to be sent by the first serving cell and the second serving cell, wherein when the maximum number of transport blocks supported by a PDSCH corresponding to a downlink transmission mode of the first serving cell is 2, the total number of bits of the HARQ-ACK information to be sent by the first serving cell and the second serving cell is 4, and when the maximum number of transport blocks supported by the PDSCH corresponding to the downlink transmission mode of the first serving cell is 1, the total number of bits of the HARQ-ACK information to be sent by the first serving cell and the second serving cell is 3.

(8) When the aggregated serving cells are a first serving cell and a second serving cell, the first serving cell corresponds to one downlink subframe and the second serving cell corresponds to four downlink subframes, spatial domain bundling is performed on the HARQ-ACK information of the first serving cell, and spatial domain bundling and then time domain bundling are performed on the HARQ-ACK information of the second serving cell to obtain HARQ-ACK information to be sent by the first serving cell and the second serving cell, wherein the number of bits of HARQ-ACK information to be sent after the bundling on the second serving cell is 3, wherein the number of bits of HARQ-ACK information to be sent after the bundling on the second serving cell being 3 refers to: performing spatial domain bundling on one downlink subframe of the second serving cell while performing time domain bundling on the other downlink subframes apart from the downlink subframe of the second serving cell; the total number of bits of the HARQ-ACK information to be sent by the first serving cell and the second serving cell is 4.

(9) When the aggregated serving cells are a first serving cell and a second serving cell, the first serving cell corresponds to one downlink subframe and the second serving cell corresponds to four downlink subframes, spatial domain bundling is performed on the HARQ-ACK information of the first serving cell, and spatial domain bundling and then time domain bundling are performed on the HARQ-ACK information of the second serving cell, wherein the number of bits of HARQ-ACK information to be sent after the bundling on the second serving cell is 3, the total number of bits of HARQ-ACK information to be sent by the first serving cell and the second serving cell is 4.

(10) When the aggregated serving cells are a first serving cell and a second serving cell, the first serving cell corresponds to two downlink subframes and the second serving cell corresponds to three downlink subframes, spatial domain bundling is performed on the HARQ-ACK information of the first serving cell, and spatial domain bundling and then time domain bundling are performed on the HARQ-ACK information of the second serving cell to obtain HARQ-ACK information to be sent by the first serving cell and the second serving cell, wherein the total number of bits of the HARQ-ACK information to be sent by the first serving cell and the second serving cell is 4.

(11) When the aggregated serving cells are a first serving cell and a second serving cell, the first serving cell corresponds to two downlink subframes and the second serving cell corresponds to four downlink subframes, spatial domain bundling is performed on the HARQ-ACK information of the first serving cell, and spatial domain bundling and then time domain bundling are performed on the HARQ-ACK information of the second serving cell to obtain HARQ-ACK information to be sent by the first serving cell and the second serving cell, wherein the total number of bits of the HARQ-ACK information to be sent by the first serving cell and the second serving cell is 4.

Method III, in the case where the maximum number of corresponding downlink subframes of the aggregated serving cells is greater than 2, Method I is applied; and in the case where the maximum number of corresponding downlink subframes of the aggregated serving cells is equal to 2, Method II is applied.

Method IV, in the case where the minimum number of corresponding downlink subframes of the aggregated serving cells is greater than 1, Method I is applied; and in the case where the minimum number of corresponding downlink subframes of the aggregated serving cells is equal to 1, method II is applied;

Method V, in the case where the channel for sending HARQ-ACK information is a PUCCH, Method I is applied; and in the case where the channel for sending the HARQ-ACK information is a PUSCH, Method II is applied.

Method VI, in the case where the channel for sending HARQ-ACK information is a PUCCH, Method I is applied; in the case where the channel for sending the HARQ-ACK information is a PUSCH and there is no corresponding DCI format 0/4, method I is applied; and in the case where the channel for sending the HARQ-ACK information is a PUSCH and there is a corresponding DCI format 0/4, Method II is applied.

Preferably, sending the HARQ-ACK information via the PUCCH or PUSCH includes one of the following: when sending via the PUCCH, the HARQ-ACK information of the serving cells is concatenated into an HARQ-ACK information sequence according to a predefined order, and then a PUCCH format 1b with channel selection method is employed to send the HARQ-ACK information sequence; and when sending via the PUSCH, the HARQ-ACK information of the serving cells is concatenated into an HARQ-ACK information sequence according to a predefined order, and then the HARQ-ACK information sequence is sent via the PUSCH.

Preferably, the predefined order includes one of the following: an order of ascending serving cell indices; and an order of uplink and downlink configuration priorities of the serving cells.

It should be noted that performing spatial domain bundling on a serving cell of which the maximum number of transport blocks supported by a PDSCH corresponding to a downlink transmission mode is 1 is equivalent to not performing spatial domain bundling on the serving cell.

The implementation of embodiments of the disclosure is described in details with reference to the embodiments below.

In the TDD system, when being configured to employ a PUCCH format 1b with channel selection method to transmit HARQ-ACK information, a UE bundles the HARQ-ACK information to be sent by an uplink subframe of each of the serving cells to obtain HARQ-ACK information to be sent by the uplink subframe of each of the serving cells, and sends the obtained HARQ-ACK information of each of the serving cells via a PUCCH or PUSCH according to one of the following methods.

Preferred Embodiment I

In the following examples, a UE bundles the HARQ-ACK information to be sent by each of the serving cells to obtain HARQ-ACK information to be sent by each of the serving cells according to one of Method I and Method II.

Example 1

Figure 4:
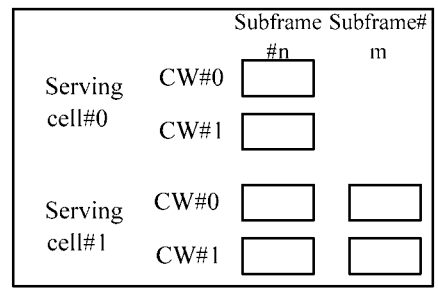
FIG. 4 is schematic diagram I according to preferred embodiment I of the disclosure.

FIG. 4 is schematic diagram I according to preferred embodiment I of the disclosure. As shown in FIG. 4, it is assumed that the UE is configured to employ a PUCCH format 1b with channel selection method to send the HARQ-ACK information and 2 serving cells are configured, and it is assumed that a PDSCH on serving cell#0 corresponds to 2 codeword streams and a PDSCH on serving cell#1 corresponds to 2 codeword streams.

Method I: each of the serving cells employs the same bundling method and the number of bits of HARQ-ACK information after the bundling operation of each of the serving cells is the same. The HARQ-ACK information after the bundling operation on serving cell#0 and serving cell#1 is 2 bits. The number of downlink subframes configured for serving cell#1 is relatively large, and therefore the bundling methods of serving cell#0 and of serving cell#1 are the same.

As regards serving cell#1, the HARQ-ACK responses corresponding to {CW#0 of subframe#n, CW#1 of subframe#n, CW#0 of subframe#m, CW#1 of subframe#m} are respectively $\{o^0_{\#1ACK}, o^1_{\#1ACK}, o^2_{\#1ACK}, o^3_{\#1ACK}\}$, and then spatial domain bundling is performed to obtain $\{o'^0_{\#1ACK}, o'^1_{\#1ACK}\}$, thus obtaining 2-bit HARQ-ACK information {HARQ-ACK$^{\#1}$(0), HARQ-ACK$^{\#1}$(1)} of serving cell#1 after the bundling operation; and as regards serving cell#0, the HARQ-ACK responses corresponding to {CW#0 of subframe#n, CW#1 of subframe#n} are respectively $\{o^0_{\#0ACK}, o^1_{\#0ACK}\}$. Performing according to a bundling method the same as that of serving cell#1 refers to: performing spatial domain bundling on $\{o^0_{\#0ACK}, o^1_{\#0ACK},$ NACK, NACK} to obtain 2-bit HARQ-ACK information {HARQ-ACK$^{\#0}$(0), HARQ-ACK$^{\#0}$(1)} of serving cell#0 after the bundling operation.

Method II: each of the serving cells is performed with a bundling operation respectively.

Bundling, according to an appointed number of bits of HARQ-ACK information of each of the serving cells after bundling and the number of HARQ-ACK responses to be sent, the HARQ-ACK responses to be sent refers to:

as regards serving cell#1, the HARQ-ACK responses corresponding to {CW#0 of subframe#n, CW#1 of subframe#n, CW#0 of subframe#m, CW#1 of subframe#m} are respectively $\{o^0_{\#1ACK}, o^1_{\#1ACK}, o^2_{\#1ACK}, o^3_{\#1ACK}\}$, and spatial domain bundling is performed to obtain 2-bit HARQ-ACK information {HARQ-ACK$^{\#1}$(0), HARQ-ACK$^{\#1}$(1)} of serving cell#1 after the bundling operation; and as regards serving cell#0, the HARQ-ACK responses corresponding to {CW#0 of subframe#n, CW#1 of subframe#n} are respectively $\{o^0_{\#0ACK}, o^1_{\#0ACK}\}$, and spatial domain bundling is performed to obtain 1-bit HARQ-ACK information {HARQ-ACK$^{\#0}$(0)} of serving cell#0 after the bundling operation, wherein the total number of bits of the HARQ-ACK information of each of the serving cells after bundling is 3.

Or, as regards serving cell#1, the HARQ-ACK responses corresponding to {CW#0 of subframe#n, CW#1 of subframe#n, CW#0 of subframe#m, CW#1 of subframe#m} are respectively $\{o^0_{\#1ACK}, o^1_{\#1ACK}, o^2_{\#1ACK}, o^3_{\#1ACK}\}$, and spatial domain bundling is performed to obtain 2-bit HARQ-ACK information {HARQ-ACK$^{\#1}$(0), HARQ-ACK$^{\#1}$(1)} of serving cell#1 after the bundling operation, and as regards serving cell#0, the HARQ-ACK responses corresponding to {CW#0 of subframe#n, CW#1 of subframe#n} are respectively $\{o^0_{\#0ACK}, o^1_{\#0ACK}\}$, and 2-bit HARQ-ACK information {HARQ-ACK$^{\#0}$(0), HARQ-ACK$^{\#0}$(1)} of serving cell#0 after the bundling operation is obtained, wherein the total number of bits of the HARQ-ACK information of each of the serving cells after bundling is 4.

Example 2

Figure 5:
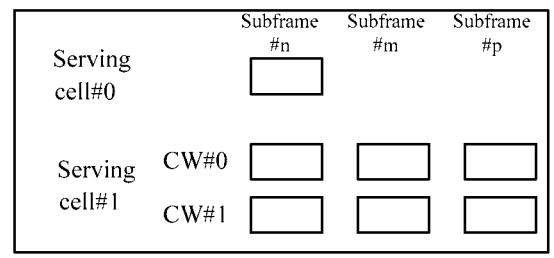
FIG. 5 is schematic diagram II according to preferred embodiment I of the disclosure.

FIG. 5 is schematic diagram II according to preferred embodiment I of the disclosure. As shown in FIG. 5, it is assumed that the UE is configured to employ a PUCCH format 1b with channel selection method to send HARQ-ACK information and 2 serving cells are configured, and it is assumed that a PDSCH on serving cell#0 corresponds to 1 codeword stream and a PDSCH on serving cell#1 corresponds to 2 codeword streams.

Method I: each of the serving cells employs the same bundling method and the number of bits of HARQ-ACK information after the bundling operation of each of the serving cells is the same. The HARQ-ACK information after the bundling operation of serving cell#0 and serving cell#1 is 2 bits. The number of downlink subframes configured for serving cell#1 is relatively large, and therefore the bundling methods of serving cell#0 and of serving cell#1 are the same.

As regards serving cell#1, the HARQ-ACK responses corresponding to {CW#0 of subframe#n, CW#1 of subframe#n, CW#0 of subframe#m, CW#1 of subframe#m, CW#0 of subframe#p, CW#1 of subframe#p} are respectively $\{o^0_{\#1ACK}, o^1_{\#1ACK}, o^2_{\#1ACK}, o^3_{\#1ACK}, o^4_{\#1ACK}, o^5_{\#1ACK}\}$ and spatial domain bundling is performed to obtain 3-bit, and then time domain bundling is performed to obtain 2-bit HARQ-ACK information {HARQ-ACK$^{\#1}$(0), HARQ-ACK$^{\#1}$(1)} of serving cell#1 after the bundling operation; and as regards serving cell#0, the HARQ-ACK response corresponding to {subframe#n} is respectively $\{o^0_{\#0ACK}\}$, and spatial domain bundling is performed on $\{o^0_{\#0ACK}, o^0_{\#0ACK},$ NACK, NACK, NACK, NACK} according to a bundling method the same as that of serving cell#1 and then time domain bundling is performed to obtain 2-bit HARQ-ACK information {HARQ-ACK$^{\#0}$(0), HARQ-ACK$^{\#0}$(1)} of serving cell#0 after the bundling operation, or first spatial domain bundling and then time domain bundling are performed on $\{o^0_{\#0ACK},$ NACK, NACK} to obtain 2-bit HARQ-ACK information {HARQ-ACK$^{\#0}$(0), HARQ-ACK$^{\#0}$(1)} of serving cell#0 after the bundling operation.

Method II: each of the serving cells is performed with a bundling operation respectively.

Bundling, according to an appointed number of bits of HARQ-ACK information of each of the serving cells after bundling and the number of HARQ-ACK responses to be sent, the HARQ-ACK responses to be sent refers to:

as regards serving cell#1, the HARQ-ACK responses corresponding to {CW#0 of subframe#n, CW#1 of subframe#n, CW#0 of subframe#m, CW#1 of subframe#m, CW#0 of subframe#p, CW#1 of subframe#p} are respectively $\{o^0_{\#1ACK}, o^1_{\#1ACK}, o^2_{\#1ACK}, o^3_{\#1ACK}, o^4_{\#1ACK}, o^5_{\#1ACK}\}$, and spatial domain bundling is performed to obtain 3-bit HARQ-ACK information {HARQ-ACK$^{\#1}$(0), HARQ-ACK$^{\#1}$(1), HARQ-ACK$^{\#1}$(2)} of serving cell#1 after the bundling operation; and as regards serving cell#0, the HARQ-ACK response corresponding to {subframe#n} is respectively $\{o^0_{\#0ACK}\}$, and 1-bit HARQ-ACK information of serving cell#0 after the bundling operation is obtained, wherein the total number of bits of the HARQ-ACK information {HARQ-ACK$^{\#0}$(0)} of each of the serving cells after bundling is 4.

Or, as regards serving cell#1, the HARQ-ACK responses corresponding to {CW#0 of subframe#n, CW#1 of subframe#n, CW#0 of subframe#m, CW#1 of subframe#m, CW#0 of subframe#p, CW#1 of subframe#p} are respectively $\{o^0_{\#1ACK}, o^1_{\#1ACK}, o^2_{\#1ACK}, o^3_{\#1ACK}, o^4_{\#1ACK}, o^5_{\#1ACK}\}$, and spatial domain bundling is performed first and then time domain bundling to obtain 2-bit HARQ-ACK information {HARQ-ACK$^{\#1}$(0), HARQ-ACK$^{\#1}$(1), HARQ-ACK$^{\#1}$(2)} of serving cell#1 after the bundling operation, and as regards serving cell#0, the HARQ-ACK response corresponding to {subframe#n} is respectively $\{o^0_{\#0ACK}\}$, and 1-bit HARQ-ACK information {HARQ-ACK$^{\#0}$(0)} of serving cell#0 after the bundling operation is obtained, wherein the total number of bits of the HARQ-ACK information of each of the serving cells after bundling is 3.

Example 3

Figure 6:
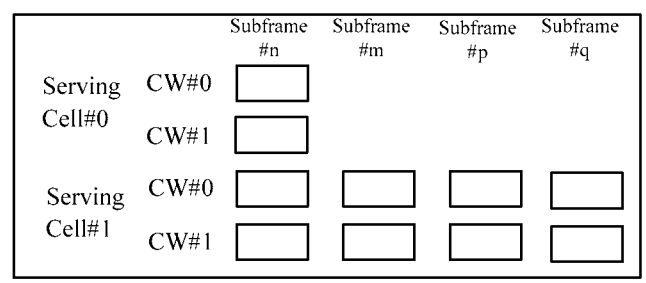
FIG. 6 is schematic diagram III according to preferred embodiment I of the disclosure.

FIG. 6 is schematic diagram III according to preferred embodiment I of the disclosure. As shown in FIG. 6, it is assumed that the UE is configured to employ a PUCCH format 1b with channel selection method to send HARQ-ACK information and 2 serving cells are configured, and it is assumed that a PDSCH on serving cell#0 corresponds to 2 codeword streams and a PDSCH on serving cell#1 corresponds to 1 codeword stream.

Method I: each of the serving cells employs the same bundling method and the number of bits of HARQ-ACK information after the bundling operation of each of the serving cells is the same. The HARQ-ACK information after the bundling operation of serving cell#0 and serving cell#1 is 2 bits. The number of downlink subframes configured for serving cell#1 is relatively large, and therefore the bundling methods of serving cell#0 and of serving cell#1 are the same.

As regards serving cell#1, the HARQ-ACK responses corresponding to {CW#0 of subframe#n, CW#1 of subframe#n, CW#0 of subframe#m, CW#1 of subframe#m, CW#0 of subframe#p, CW#1 of subframe#p, CW#0 of subframe#q, CW#1 of subframe#q} are respectively $\{o^0_{\#1ACK}, o^1_{\#1ACK}, o^2_{\#1ACK}, o^3_{\#1ACK}, o^4_{\#1ACK}, o^4_{\#1ACK}, o^5_{\#1ACK}, o^6_{\#1ACK}, o^7_{\#1ACK}\}$, and spatial domain bundling is performed to obtain 4-bit, and then time domain bundling is performed to obtain 2-bit HARQ-ACK information $\{HARQ\text{-}ACK^{\#1}(0), HARQ\text{-}ACK^{\#1}(1)\}$ of serving cell#1 after the bundling operation; and as regards serving cell#0, the HARQ-ACK responses corresponding to {CW#0 of subframe#n, CW#1 of subframe#n} are respectively $\{o^0_{\#0ACK}, o^1_{\#0ACK}\}$, and then spatial domain bundling is performed on $\{o^0_{\#0ACK}, o^1_{\#0ACK}, NACK, NACK, NACK, NACK, NACK, NACK\}$ according to a bundling method the same as that of serving cell#1 and then time domain bundling is performed to obtain 2-bit HARQ-ACK information $\{HARQ\text{-}ACK^{\#0}(0), HARQ\text{-}ACK^{\#0}(1)\}$ of serving cell#0 after the bundling operation, or first spatial domain bundling is performed on $\{o^0_{\#0ACK}, NACK, NACK, NACK\}$ and then time domain bundling to obtain 2-bit HARQ-ACK information $\{HARQ\text{-}ACK^{\#0}(0), HARQ\text{-}ACK^{\#0}(1)\}$ of serving cell#0 after the bundling operation, wherein $\{o'^0_{\#0ACK}\}$ is obtained by spatial domain bundling of $\{o^0_{\#0ACK}, o^1_{\#0ACK}\}$.

Method II: each of the serving cells is performed with a bundling operation respectively.

Bundling, according to an appointed number of bits of HARQ-ACK information of each of the serving cells after bundling and the number of HARQ-ACK responses to be sent, the HARQ-ACK responses to be sent refers to:

as regards serving cell#1, the HARQ-ACK responses corresponding to {CW#0 of subframe#n, CW#1 of subframe#n, CW#0 of subframe#m, CW#1 of subframe#m, CW#0 of subframe#p, CW#1 of subframe#p, CW#0 of subframe#q, CW#1 of subframe#q} are respectively $\{o^0_{\#1ACK}, o^2_{\#1ACK}, o^3_{\#1ACK}, o^4_{\#1ACK}, o^5_{\#1ACK}, o^6_{\#1ACK}, o^7_{\#1ACK}\}$, spatial domain bundling is performed to obtain 4-bit, and then time domain bundling is performed to obtain 2-bit HARQ-ACK information $\{HARQ\text{-}ACK^{\#1}(0), HARQ\text{-}ACK^{\#1}(1)\}$ of serving cell#1 after the bundling operation; and as regards serving cell#0, the HARQ-ACK responses corresponding to {CW#0 of subframe#n, CW#1 of subframe#n} are respectively $\{o^0_{\#0ACK}, o^1_{\#0ACK}\}$, and spatial domain bundling is performed to obtain 1-bit HARQ-ACK information $\{HARQ\text{-}ACK^{\#0}(0)\}$ to be sent by serving cell#0, wherein the total number of bits of the HARQ-ACK information of each of the serving cells after bundling is 3.

Or, as regards serving cell#1, the HARQ-ACK responses corresponding to {CW#0 of subframe#n, CW#1 of subframe#n, CW#0 of subframe#m, CW#1 of subframe#m, CW#0 of subframe#p, CW#1 of subframe#p, CW#0 of subframe#q, CW#1 of subframe#q} are respectively $\{o^0_{\#1ACK}, o^1_{\#1ACK}, o^2_{\#1ACK}, o^3_{\#1ACK}, o^4_{\#1ACK}, o^5_{\#1ACK}, o^6_{\#1ACK}, o^7_{\#1ACK}\}$, and spatial domain bundling is performed to obtain 4-bit, and then time domain bundling is performed to obtain 2-bit HARQ-ACK information $\{HARQ\text{-}ACK^{\#1}(0), HARQ\text{-}ACK^{\#1}(1)\}$ of serving cell#1 after the bundling operation, and as regards serving cell#0, the HARQ-ACK responses corresponding to {CW#0 of subframe#n, CW#1 of subframe#n} are respectively $\{o^0_{\#0ACK}, o^1_{\#0ACK}\}$, and 2-bit HARQ-ACK information $\{HARQ\text{-}ACK^{\#0}(0), HARQ\text{-}ACK^{\#0}(1)\}$ to be sent by serving cell#0 is obtained, wherein the total number of bits of the HARQ-ACK information of each of the serving cells after bundling is 4.

Or, as regards serving cell#1, the HARQ-ACK responses corresponding to {CW#0 of subframe#n, CW#1 of subframe#n, CW#0 of subframe#m, CW#1 of subframe#m, CW#0 of subframe#p, CW#1 of subframe#p, CW#0 of subframe#q, CW#1 of subframe#q} are respectively $\{o^0_{\#1ACK}, o^1_{\#1ACK}, o^2_{\#1ACK}, o^3_{\#1ACK}, o^4_{\#1ACK}, o^5_{\#1ACK}, o^6_{\#1ACK}, o^7_{\#1ACK}\}$, and spatial domain bundling is performed to obtain 4-bit, and then time domain bundling is performed to obtain 3-bit HARQ-ACK information $\{HARQ\text{-}ACK^{\#1}(0), HARQ\text{-}ACK^{\#1}(1), HARQ\text{-}ACK^{\#1}(2)\}$ of serving cell #1 after the bundling operation, and as regards serving cell#0, the HARQ-ACK responses corresponding to {CW#0 of subframe#n, CW#1 of subframe#n} are respectively $\{o^0_{\#0ACK}, o^1_{\#0ACK}\}$, and spatial domain bundling is performed to obtain 1-bit HARQ-ACK information $\{HARQ\text{-}ACK^{\#0}(0)\}$ to be sent by serving cell#0, wherein the total number of bits of HARQ-ACK information of each of the serving cells after bundling is 4.

Example 4

Figure 7:
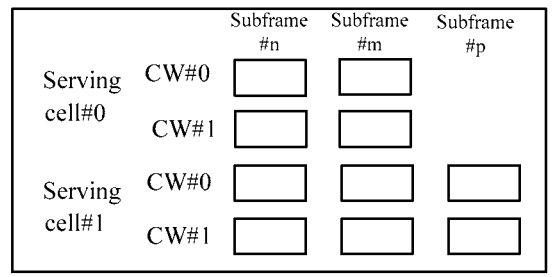
FIG. 7 is schematic diagram IV according to preferred embodiment I of the disclosure.

FIG. 7 is schematic diagram IV according to preferred embodiment I of the disclosure. As shown in FIG. 7, it is assumed that the UE is configured to employ a PUCCH format 1b with channel selection method to send HARQ-ACK information and 2 serving cells are configured, and it is assumed that a PDSCH on serving cell#0 corresponds to 2 codeword streams and a PDSCH on serving cell#1 corresponds to 1 codeword streams.

Method I: each of the serving cells employs the same bundling method and the number of bits of HARQ-ACK information after the bundling operation of each of the serving cells is the same. The HARQ-ACK information after the bundling operation of serving cell#0 and serving cell#1 is 2 bits. The number of downlink subframes configured for serving cell#1 is relatively large, and therefore the bundling methods of serving cell#0 and of serving cell#1 are the same.

As regards serving cell#1, the HARQ-ACK responses corresponding to {CW#0 of subframe#n, CW#1 of subframe#n, CW#0 of subframe#m, CW#1 of subframe#m, CW#0 of subframe#p, CW#1 of subframe#p} are respectively $\{o^0_{\#1ACK}, o^1_{\#1ACK}, o^2_{\#1ACK}, o^3_{\#1ACK}, o^4_{\#1ACK}, o^5_{\#1ACK}\}$, and spatial domain bundling is performed to obtain 3-bit, and then time domain bundling is performed to obtain 2-bit HARQ-ACK information $\{HARQ\text{-}ACK^{\#1}(0), HARQ\text{-}ACK^{\#1}(1)\}$ of serving cell#1 after the bundling operation; and as regards serving cell#0, the HARQ-ACK responses corresponding to {CW#0 of subframe#n, CW#1 of subframe#n, CW#0 of subframe#m, CW#1 of subframe#m} are respectively $\{o^0_{\#0ACK}, o^1_{\#0ACK}, o^2_{\#0ACK}, o^3_{\#0ACK}\}$, and then spatial domain bundling is performed on $\{o^0_{\#0ACK}, o^1_{\#0ACK}, o^2_{\#0ACK}, o^3_{\#0ACK}, NACK, NACK\}$ according to a bundling method the same as that of serving cell#1 and then time domain bundling is performed to obtain 2-bit HARQ-ACK information $\{HARQ\text{-}ACK^{\#0}(0), HARQ\text{-}ACK^{\#0}(1)\}$ of serving cell#0 after the bundling operation, or first spatial domain bundling is performed on $\{o'^0_{\#0ACK}, o'^1_{\#0ACK}, NACK\}$ and then time domain bundling to obtain 2-bit HARQ-ACK information $\{HARQ\text{-}ACK^{\#0}(0), HARQ\text{-}$ ACK$^{\#0}$(1)} of serving cell#0 after the bundling operation, wherein is {o'$^0$$_{\#0ACK}$} obtained by performing spatial domain bundling on {o$^0$$_{\#0ACK}$, o$^1$$_{\#0ACK}$}, and {o'$^1$$_{\#0ACK}$} is obtained by performing spatial domain bundling on {o$^2$$_{\#0ACK}$, o$^3$$_{\#0ACK}$}.

Method II: each of the serving cells is performed with a bundling operation respectively.

Bundling, according to an appointed number of bits of HARQ-ACK information of each of the serving cells after bundling and a number of HARQ-ACK responses to be sent, the HARQ-ACK responses to be sent refers to:

as regards serving cell#1, the HARQ-ACK responses corresponding to {CW#0 of subframe#n, CW#1 of subframe#n, CW#0 of subframe#m, CW#1 of subframe#m, CW#0 of subframe#p, CW#1 of subframe#p, CW#0 of subframe#q, CW#1 of subframe#q} are respectively {o$^0$$_{\#1ACK}$, o$^1$$_{\#1ACK}$, o$^2$$_{\#1ACK}$, o$^3$$_{\#1ACK}$, o$^4$$_{\#1ACK}$, o$^5$$_{\#1ACK}$, o$^6$$_{\#1ACK}$, o$^7$$_{\#1ACK}$}, spatial domain bundling is performed to obtain 3-bit, and then time domain bundling is performed to obtain 2-bit HARQ-ACK information {HARQ-ACK$^{\#0}$(0), HARQ-ACK$^{\#0}$(1)} of serving cell#1 after the bundling operation, and as regards serving cell#0, the HARQ-ACK responses corresponding to {CW#0 of subframe#n, CW#1 of subframe#n, CW#0 of subframe#m, CW#1 of subframe#m} are respectively {o$^0$$_{\#0ACK}$, o$^0$$_{\#0ACK}$, o$^2$$_{\#0ACK}$, o$^3$$_{\#0ACK}$}, and spatial domain bundling is performed to obtain 2-bit HARQ-ACK information {HARQ-ACK$^{\#0}$(0), HARQ-ACK$^{\#0}$(1)} of serving cell#0, wherein the total number of bits of the HARQ-ACK information of each of the serving cells after bundling is 4.

Example 5

Figure 8:
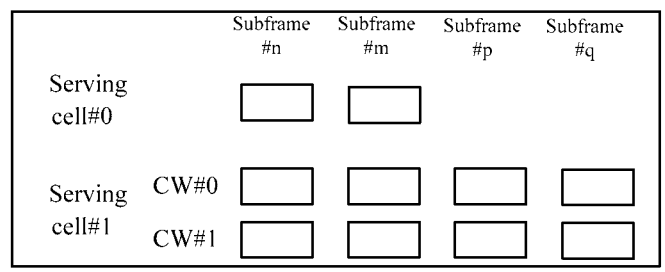
FIG. 8 is schematic diagram V according to preferred embodiment I of the disclosure.

FIG. 8 is schematic diagram V according to preferred embodiment I of the disclosure. As shown in FIG. 8, it is assumed that the UE is configured to employ a PUCCH format 1b with channel selection method to send HARQ-ACK information and 2 serving cells are configured, and it is assumed that a PDSCH on serving cell#0 corresponds to 1 codeword stream and a PDSCH on serving cell#1 corresponds to 1 codeword stream.

Method I: each of the serving cells employs the same bundling method and the number of bits of HARQ-ACK information after the bundling operation of each of the serving cells is the same. The HARQ-ACK information after the bundling operation of serving cell#0 and serving cell#1 is 2 bits. The number of downlink subframes configured for serving cell#1 is relatively large, and therefore the bundling methods of serving cell#0 and of serving cell#1 are the same.

As regards serving cell#1, the HARQ-ACK responses corresponding to {CW#0 of subframe#n, CW#1 of subframe#n, CW#0 of subframe#m, CW#1 of subframe#m, CW#0 of subframe#p, CW#1 of subframe#p, CW#0 of subframe#q, CW#1 of subframe#q} are respectively {o$^0$$_{\#1ACK}$, o$^1$$_{\#1ACK}$, o$^2$$_{\#1ACK}$, o$^3$$_{\#1ACK}$, o$^4$$_{\#1ACK}$, o$^5$$_{\#1ACK}$, o$^6$$_{\#1ACK}$, o$^7$$_{\#1ACK}$}, spatial domain bundling is performed to obtain 4-bit, and then time domain bundling is performed to obtain 2-bit HARQ-ACK information {HARQ-ACK$^{\#0}$(0), HARQ-ACK$^{\#0}$(1)} of serving cell#1 after the bundling operation; and as regards serving cell#0, the HARQ-ACK responses corresponding to {subframe#n, subframe#m} are respectively {o$^0$$_{\#0ACK}$, o$^1$$_{\#0ACK}$}, and spatial domain bundling is performed on {o$^0$$_{\#0ACK}$, o$^0$$_{\#0ACK}$, o$^1$$_{\#0ACK}$, o$^1$$_{\#0ACK}$, NACK, NACK, NACK, NACK} according to a bundling method the same as that of serving cell#1 and then time domain bundling is performed to obtain 2-bit HARQ-ACK information {HARQ-ACK$^{\#0}$(0), HARQ-ACK$^{\#0}$(1)} of serving cell#0 after the bundling operation, or first spatial domain bundling is performed on {o$^0$$_{\#0ACK}$, o$^1$$_{\#0ACK}$, NACK, NACK} and then time domain bundling to obtain 2-bit HARQ-ACK information {HARQ-ACK$^{\#0}$(0), HARQ-ACK$^{\#0}$(1)} of serving cell#0 after the bundling operation.

Method II: each of the serving cells is performed with a bundling operation respectively.

Bundling, according to an appointed number of bits of HARQ-ACK information of each of the serving cells after bundling and the number of HARQ-ACK responses to be sent, the HARQ-ACK responses to be sent refers to:

as regards serving cell#1, the HARQ-ACK responses corresponding to {CW#0 of subframe#n, CW#1 of subframe#n, CW#0 of subframe#m, CW#1 of subframe#m, CW#0 of subframe#p, CW#1 of subframe#p, CW#0 of subframe#q, CW#1 of subframe#q} are respectively {o$^0$$_{\#1ACK}$, o$^1$$_{\#1ACK}$, o$^2$$_{\#1ACK}$, o$^3$$_{\#1ACK}$, o$^4$$_{\#1ACK}$, o$^5$$_{\#1ACK}$, o$^6$$_{\#1ACK}$, o$^7$$_{\#1ACK}$}, spatial domain bundling is performed to obtain 4-bit, and then time domain bundling is performed to obtain 2-bit HARQ-ACK information {HARQ-ACK$^{\#1}$(0), HARQ-ACK$^{\#1}$(1)} of serving cell#1 after the bundling operation, and as regards serving cell#0, the HARQ-ACK responses corresponding to {subframe#n, subframe#m} are respectively {o$^0$$_{\#0ACK}$, o$^1$$_{\#0ACK}$}, and 2-bit HARQ-ACK information {HARQ-ACK$^{\#0}$(0), HARQ-ACK$^{\#0}$(1)} of serving cell#0 is obtained, wherein the total number of bits of the HARQ-ACK information of each of the serving cells after bundling is 4.

Example 6

Figure 9:
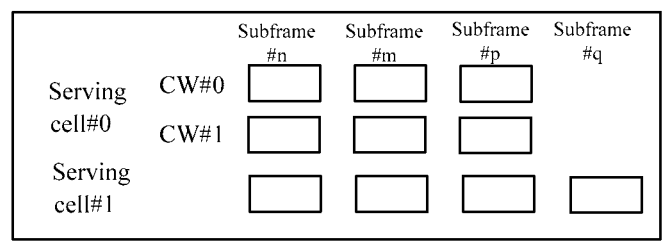
FIG. 9 is schematic diagram VI according to preferred embodiment I of the disclosure.

FIG. 9 is schematic diagram VI according to preferred embodiment I of the disclosure. As shown in FIG. 9, it is assumed that the UE is configured to employ a PUCCH format 1b with channel selection method to send HARQ-ACK information and 2 serving cells are configured, and it is assumed that a PDSCH on serving cell#0 corresponds to 2 codeword streams and a PDSCH on serving cell#1 corresponds to 1 codeword stream.

Method I: each of the serving cells employs the same bundling method and the number of bits of HARQ-ACK information after the bundling operation of each of the serving cells is the same. The HARQ-ACK information after the bundling operation of serving cell#0 and serving cell#1 is 2 bits. The number of downlink subframes configured for serving cell#1 is relatively large, and therefore the bundling methods of serving cell#0 and of serving cell#1 are the same.

As regards serving cell#1, the HARQ-ACK responses corresponding to {subframe#n, subframe#m, subframe#p, subframe#q} are respectively {o$^0$$_{\#1ACK}$, o$^1$$_{\#1ACK}$, o$^2$$_{\#1ACK}$, o$^3$$_{\#1ACK}$}, and first spatial domain bundling is performed to obtain 4-bit, and then time domain bundling is performed to obtain 2-bit HARQ-ACK information {HARQ-ACK$^{\#1}$(0), HARQ-ACK$^{\#1}$(1)} of serving cell#1 after the bundling operation; and as regards serving cell#0, the HARQ-ACK responses corresponding to {CW#0 of subframe#n, CW#1 of subframe#n, CW#0 of subframe#m, CW#1 of subframe#m, CW#0 of subframe#p, CW#1 of subframe#p} are respectively {o$^0$$_{\#0ACK}$, o$^1$$_{\#0ACK}$, o$^2$$_{\#0ACK}$, o$^3$$_{\#0ACK}$, o$^4$$_{\#0ACK}$, o$^5$$_{\#0ACK}$}, and spatial domain bundling is performed on {o$^0$$_{\#0ACK}$, o$^1$$_{\#0ACK}$, o$^2$$_{\#0ACK}$, o$^3$$_{\#0ACK}$, o$^4$$_{\#0ACK}$, o$^5$$_{\#0ACK}$, NACK, NACK} according to a bundling method the same as that of serving cell#1 and then time domain bundling is performed to obtain 2-bit HARQ-ACK information {HARQ-ACK$^{\#0}$(0), HARQ-ACK$^{\#0}$(1)} of serving cell#0 after the bundling operation, or first spatial domain bundling is performed on $\{o'^0_{\#0ACK}, o'^1_{\#0ACK}, o'^2_{\#0ACK}, NACK\}$ and then time domain bundling to obtain 2-bit HARQ-ACK information $\{HARQ\text{-}ACK^{\#0}(0), HARQ\text{-}ACK^{\#0}(1)\}$ of serving cell#0 after the bundling operation, wherein $\{o'^0_{\#0ACK}\}$ is obtained by performing spatial domain bundling on $\{o^0_{\#0ACK}, o^1_{\#0ACK}\}$; $\{o'^1_{\#0ACK}\}$ is obtained by performing spatial domain bundling on $\{o^2_{\#0ACK}, o^3_{\#0ACK}\}$; and $\{o'^2_{\#0ACK}\}$ is obtained by performing spatial domain bundling on $\{o^4_{\#0ACK}, o^5_{\#0ACK}\}$.

Thus, when UE bundles the HARQ-ACK response to be sent by each of the serving cells to obtain HARQ-ACK information to be sent by each of the serving cells, the HARQ-ACK information of each of the serving cells also needs to be sent via a PUCCH or PUSCH.

If sending via the PUCCH, the obtained HARQ-ACK information is concatenated into an HARQ-ACK information sequence HARQ-ACK(j)=$\{HARQ\text{-}ACK^{\#0}, HARQ\text{-}ACK^{\#1}\}$ (j=0, . . . , J−1) according to an order of ascending indices of serving cell#0, serving cell#1, and then a format 1b with channel selection method is used for sending; or, the obtained HARQ-ACK information is concatenated into an HARQ-ACK information sequence HARQ-ACK(j)=$\{HARQ\text{-}ACK^{\#0}, HARQ\text{-}ACK^{\#1}\}$ (j=0, . . . , J−1) according to an order of ascending numbers of downlink subframes, and then a PUCCH format 1b with channel selection method is used for sending; or, the obtained HARQ-ACK information is concatenated into an HARQ-ACK information sequence HARQ-ACK(j)=$\{HARQ\text{-}ACK^{\#1}, HARQ\text{-}ACK^{\#0}\}$ (j=0, . . . , J−1) according to an order of descending numbers of downlink subframes, and then the PUCCH format 1b with channel selection method is used for sending. The use of a PUCCH format 1b with channel selection method for sending refers to: as regards Method I, selecting a corresponding mapping table according to the number of downlink subframes corresponding to a serving cell with more downlink subframes corresponding to subframe n, and selecting a corresponding PUCCH resource and b(0)b(1) according to the obtained HARQ-ACK information sequence and the mapping table for sending; and as regards Method II, selecting a corresponding mapping table according to the length of the obtained HARQ-ACK information sequence, and selecting a corresponding PUCCH resource and b(0)b(1) according to the obtained HARQ-ACK information sequence and the mapping table for sending.

If sending via the PUSCH, the obtained HARQ-ACK information is concatenated into an HARQ-ACK information sequence HARQ-ACK(j)=$\{HARQ\text{-}ACK^{\#0}, HARQ\text{-}ACK^{\#1}\}$ (j=0, . . . , J−1) according to an order of ascending indices of serving cell#0, serving cell#1, and then is sent via the PUSCH; or, the obtained HARQ-ACK information is concatenated into an HARQ-ACK information sequence HARQ-ACK(j)=$\{HARQ\text{-}ACK^{\#0}, HARQ\text{-}ACK^{\#1}\}$ (j=0, . . . , J−1) according to an order of ascending numbers of downlink subframes, and then is sent via the PUSCH; or, the obtained HARQ-ACK information is concatenated into an HARQ-ACK information sequence HARQ-ACK(j)=$\{HARQ\text{-}ACK^{\#1}, HARQ\text{-}ACK^{\#0}\}$ (j=0, . . . , J−1) according to an order of descending numbers of downlink subframes, and then is sent via the PUSCH.

Preferred Embodiment II

Example 1

As shown in FIG. 5, it is assumed that the UE is configured to employ a PUCCH format 1b with channel selection method to send HARQ-ACK information and 2 serving cells are configured, and it is assumed that a PDSCH on serving cell#0 corresponds to 1 codeword stream and a PDSCH on serving cell#1 corresponds to 2 codeword streams, and the number of downlink subframes configured for serving cell 1 is relatively large.

Method I is employed, i.e. after the bundling operation of serving cell#0 and serving cell#1, the HARQ-ACK information is 2 bits, and the bundling methods of serving cell#0 and of serving cell#1 are the same, and bundling the HARQ-ACK response to be sent by each of the serving cells to obtain HARQ-ACK information to be sent by each of the serving cells; and sending the obtained HARQ-ACK information of each of the serving cells via a PUCCH or PUSCH refers to:

as regards serving cell#1, the HARQ-ACK responses corresponding to {CW#0 of subframe#n, CW#1 of subframe#n, CW#0 of subframe#m, CW#1 of subframe#m, CW#0 of subframe#p, CW#1 of subframe#p} are respectively $\{o^0_{\#1ACK}, o^1_{\#1ACK}, o^2_{\#1ACK}, o^3_{\#1ACK}, o^4_{\#1ACK}, o^5_{\#1ACK}\}$, and spatial domain bundling is performed to obtain a 3-bit ACK/NACK/DTX response $\{HARQ\text{-}ACK^{\#1}(0), HARQ\text{-}ACK^{\#1}(1), HARQ\text{-}ACK^{\#1}(2)\}$; as regards serving cell#0, the HARQ-ACK response corresponding to {subframe#n} is respectively $\{o^0_{\#0ACK}\}$, and spatial domain bundling is performed on $\{o^0_{\#0ACK}, o^0_{\#0ACK}, NACK, NACK, NACK, NACK\}$ according to a bundling method the same as that of serving cell#1 to obtain a 3-bit ACK/NACK/DTX response $\{HARQ\text{-}ACK^{\#0}(0), HARQ\text{-}ACK^{\#0}(1), HARQ\text{-}ACK^{\#0}(2)\}$, or to directly obtain a 3-bit ACK/NACK/DTX response pair $\{HARQ\text{-}ACK^{\#0}(0), HARQ\text{-}ACK^{\#0}(1), HARQ\text{-}ACK^{\#0}(2)\}=\{o^0_{\#0ACK}, NACK, NACK\}$; and when sending via the PUCCH, a PUCCH resource to be used and b(0)b(1) to be sent are obtained from Table 4 according to the ACK/NACK/DTX response of each cell and then sent, or when sending via the PUSCH, coding input bits o(0), o(1), o(2), o(3) are obtained from Table 4 according to the ACK/NACK/DTX response of each cell and then sent.

TABLE 4

| Mapping table | | | | |
|---|---|---|---|---|
| Serving cell #0 | Serving cell #1 | Resource | Constellation point | Coding input bit |
| HARQ-ACK(0), HARQ-ACK(1), HARQ-ACK(2) | HARQ-ACK(0), HARQ-ACK(1), HARQ-ACK(2) | $n_{PUCCH}^{(1)}$ | b(0), b(1) | o(0), o(1), o(2), o(3) |
| ACK, ACK, ACK | ACK, ACK, ACK | $n_{PUCCH,1}^{(1)}$ | 1, 1 | 1, 1, 1, 1 |
| ACK, ACK, NACK/DTX | ACK, ACK, ACK | $n_{PUCCH,1}^{(1)}$ | 0, 0 | 1, 0, 1, 1 |
| ACK, NACK/DTX, any | ACK, ACK, ACK | $n_{PUCCH,3}^{(1)}$ | 1, 1 | 0, 1, 1, 1 |

TABLE 4-continued

Mapping table

| Serving cell #0 | Serving cell #1 | Resource | Constellation point | Coding input bit |
|---|---|---|---|---|
| NACK/DTX, any, any | ACK, ACK, ACK | $n_{PUCCH,3}^{(1)}$ | 0, 1 | 0, 0, 1, 1 |
| ACK, ACK, ACK | ACK, ACK, NACK/DTX | $n_{PUCCH,0}^{(1)}$ | 1, 0 | 1, 1, 1, 0 |
| ACK, ACK, NACK/DTX | ACK, ACK, NACK/DTX | $n_{PUCCH,3}^{(1)}$ | 1, 0 | 1, 0, 1, 0 |
| ACK, NACK/DTX, any | ACK, ACK, NACK/DTX | $n_{PUCCH,0}^{(1)}$ | 0, 1 | 0, 1, 1, 0 |
| NACK/DTX, any, any | ACK, ACK, NACK/DTX | $n_{PUCCH,3}^{(1)}$ | 0, 0 | 0, 0, 1, 0 |
| ACK, ACK, ACK | ACK, NACK/DTX, any | $n_{PUCCH,2}^{(1)}$ | 1, 1 | 1, 1, 0, 1 |
| ACK, ACK, NACK/DTX | ACK, NACK/DTX, any | $n_{PUCCH,2}^{(1)}$ | 0, 1 | 1, 0, 0, 1 |
| ACK, NACK/DTX, any | ACK, NACK/DTX, any | $n_{PUCCH,2}^{(1)}$ | 1, 0 | 0, 1, 0, 1 |
| NACK/DTX, any, any | ACK, NACK/DTX, any | $n_{PUCCH,2}^{(1)}$ | 0, 0 | 0, 0, 0, 1 |
| ACK, ACK, ACK | NACK/DTX, any, any | $n_{PUCCH,1}^{(1)}$ | 1, 0 | 1, 1, 0, 0 |
| ACK, ACK, NACK/DTX | NACK/DTX, any, any | $n_{PUCCH,1}^{(1)}$ | 0, 1 | 1, 0, 0, 0 |
| ACK, NACK/DTX, any | NACK/DTX, any, any | $n_{PUCCH,0}^{(1)}$ | 1, 1 | 0, 1, 0, 0 |
| NACK, any, any | NACK/DTX, any, any | $n_{PUCCH,0}^{(1)}$ | 0, 0 | 0, 0, 0, 0 |
| DTX, any, any | NACK/DTX, any, any | Not transmitted | | 0, 0, 0, 0 |

Example 2

As shown in FIG. 6, it is assumed that the UE is configured to employ a PUCCH format 1b with channel selection method to send HARQ-ACK information and 2 serving cells are configured, and it is assumed that a PDSCH on serving cell#0 corresponds to 2 codeword stream and a PDSCH on serving cell#1 corresponds to 2 codeword streams, and the number of downlink subframes configured for serving cell 1 is relatively large.

Method I is employed, i.e. after the bundling operation of serving cell#0 and serving cell#1, the HARQ-ACK information is 2 bits, and the bundling methods of serving cell#0 and of serving cell#1 are the same, and bundling the HARQ-ACK response to be sent by each of the serving cells to obtain HARQ-ACK information to be sent by each of the serving cells; and sending the obtained HARQ-ACK information of each of the serving cells via a PUCCH or PUSCH refers to:

as regards serving cell#1, the HARQ-ACK responses corresponding to {CW#0 of subframe#n, CW#1 of subframe#n, CW#0 of subframe#m, CW#1 of subframe#m, CW#0 of subframe#p, CW#1 of subframe#p, CW#0 of subframe#q, CW#1 of subframe#q} are respectively $\{o^0_{\#1ACK}, o^1_{\#1ACK}, o^2_{\#1ACK}, o^3_{\#1ACK}, o^4_{\#1ACK}, o^5_{\#1ACK}, o^6_{\#1ACK}, o^7_{\#1ACK}\}$, and spatial domain bundling is performed to obtain a 4-bit ACK/NACK/DTX response {HARQ-ACK#1(0), HARQ-ACK#1(1), HARQ-ACK#1(2), HARQ-ACK#1(3)}; as regards serving cell#0, the HARQ-ACK responses corresponding to {CW#0 of subframe#n, CW#1 of subframe#n} are respectively $\{o^0_{\#0ACK}, o^1_{\#0ACK}\}$, and spatial domain bundling is performed on $\{o^0_{\#0ACK}, o^1_{\#0ACK}, \text{NACK, NACK, NACK, NACK, NACK, NACK}\}$ according to a bundling method the same as that of serving cell#1 to obtain a 4-bit ACK/NACK/DTX response {HARQ-ACK#0(0), HARQ-ACK#0(1), HARQ-ACK#0(2), HARQ-ACK#0(3)}, or spatial domain bundling is performed on $\{o^0_{\#0ACK}, o^1_{\#0ACK}\}$ to obtain $\{o^{t0}_{\#0ACK}\}$, thus a 4-bit ACK/NACK/DTX response obtained by serving cell#0 being {HARQ-ACK#0(0), HARQ-ACK#0(1), HARQ-ACK#0(2), HARQ-ACK#0(3)}={$o^{t0}_{\#0ACK}$, NACK, NACK, NACK}; and a PUCCH resource to be used and b(0)b(1) to be sent are obtained from Table 5 according to the ACK/NACK/DTX response of each cell and then sent, or when sending via the PUSCH, coding input bits o(0), o(1), o(2), o(3) are obtained from Table 5 according to the ACK/NACK/DTX response of each cell and then sent.

TABLE 5

Mapping table when M = 4

| Serving cell#0 | Serving cell#1 | Resource | Constellation point | Coding bit input |
|---|---|---|---|---|
| HARQ-ACK(0), HARQ-ACK(1), HARQ-ACK(2), HARQ-ACK(3) | HARQ-ACK(0), HARQ-ACK(1), HARQ-ACK(2), HARQ-ACK(3) | $n_{PUCCH}^{(1)}$ | b(0), b(1) | o(0), o(1), o(2), o(3) |
| ACK, ACK, ACK, NACK/DTX | ACK, ACK, ACK, NACK/DTX | $n_{PUCCH,1}^{(1)}$ | 1, 1 | 1, 1, 1, 1 |

TABLE 5-continued

| Mapping table when M = 4 | | | | |
|---|---|---|---|---|
| Serving cell#0 | Serving cell#1 | Resource | Constellation point | Coding bit input |
| ACK, ACK, NACK/DTX, any | ACK, ACK, ACK, NACK/DTX | $n_{PUCCH,1}^{(1)}$ | 0, 0 | 1, 0, 1, 1 |
| ACK, DTX, DTX, DTX | ACK, ACK, ACK, NACK/DTX | $n_{PUCCH,3}^{(1)}$ | 1, 1 | 0, 1, 1, 1 |
| ACK, ACK, ACK, ACK | ACK, ACK, ACK, NACK/DTX | $n_{PUCCH,3}^{(1)}$ | 1, 1 | 0, 1, 1, 1 |
| NACK/DTX, any, any, any | ACK, ACK, ACK, NACK/DTX | $n_{PUCCH,3}^{(1)}$ | 0, 1 | 0, 0, 1, 1 |
| (ACK, NACK/DTX, any, any), except for (ACK, DTX, DTX, DTX) | ACK, ACK, ACK, NACK/DTX | $n_{PUCCH,3}^{(1)}$ | 0, 1 | 0, 0, 1, 1 |
| ACK, ACK, ACK, NACK/DTX | ACK, ACK, NACK/DTX, any | $n_{PUCCH,0}^{(1)}$ | 1, 0 | 1, 1, 1, 0 |
| ACK, ACK, NACK/DTX, any | ACK, ACK, NACK/DTX, any | $n_{PUCCH,3}^{(1)}$ | 1, 0 | 1, 0, 1, 0 |
| ACK, DTX, DTX, DTX | ACK, ACK, NACK/DTX, any | $n_{PUCCH,0}^{(1)}$ | 0, 1 | 0, 1, 1, 0 |
| ACK, ACK, ACK, ACK | ACK, ACK, NACK/DTX, any | $n_{PUCCH,0}^{(1)}$ | 0, 1 | 0, 1, 1, 0 |
| NACK/DTX, any, any, any | ACK, ACK, NACK/DTX, any | $n_{PUCCH,3}^{(1)}$ | 0, 0 | 0, 0, 1, 0 |
| (ACK, NACK/DTX, any, any), except for (ACK, DTX, DTX, DTX) | ACK, ACK, NACK/DTX, any | $n_{PUCCH,3}^{(1)}$ | 0, 0 | 0, 0, 1, 0 |
| ACK, ACK, ACK, NACK/DTX | ACK, DTX, DTX, DTX | $n_{PUCCH,2}^{(1)}$ | 1, 1 | 1, 1, 0, 1 |
| ACK, ACK, ACK, NACK/DTX | ACK, ACK, ACK, ACK | $n_{PUCCH,2}^{(1)}$ | 1, 1 | 1, 1, 0, 1 |
| ACK, ACK, NACK/DTX, any | ACK, DTX, DTX, DTX | $n_{PUCCH,2}^{(1)}$ | 0, 1 | 1, 0, 0, 1 |
| ACK, ACK, NACK/DTX, any | ACK, ACK, ACK, ACK | $n_{PUCCH,2}^{(1)}$ | 0, 1 | 1, 0, 0, 1 |
| ACK, DTX, DTX, DTX | ACK, DTX, DTX, DTX | $n_{PUCCH,2}^{(1)}$ | 1, 0 | 0, 1, 0, 1 |
| ACK, DTX, DTX, DTX | ACK, ACK, ACK, ACK | $n_{PUCCH,2}^{(1)}$ | 1, 0 | 0, 1, 0, 1 |
| ACK, ACK, ACK, ACK | ACK, DTX, DTX, DTX | $n_{PUCCH,2}^{(1)}$ | 1, 0 | 0, 1, 0, 1 |
| ACK, ACK, ACK, ACK | ACK, ACK, ACK, ACK | $n_{PUCCH,2}^{(1)}$ | 1, 0 | 0, 1, 0, 1 |
| NACK/DTX, any, any, any | ACK, DTX, DTX, DTX | $n_{PUCCH,2}^{(1)}$ | 0, 0 | 0, 0, 0, 1 |
| NACK/DTX, any, any, any | ACK, ACK, ACK, ACK | $n_{PUCCH,2}^{(1)}$ | 0, 0 | 0, 0, 0, 1 |
| (ACK, NACK/DTX, any, any), except for (ACK, DTX, DTX, DTX) | ACK, DTX, DTX, DTX | $n_{PUCCH,2}^{(1)}$ | 0, 0 | 0, 0, 0, 1 |
| (ACK, NACK/DTX, any, any), except for (ACK, DTX, DTX, DTX) | ACK, ACK, ACK, ACK | $n_{PUCCH,2}^{(1)}$ | 0, 0 | 0, 0, 0, 1 |
| ACK, ACK, ACK, NACK/DTX | NACK/DTX, any, any, any | $n_{PUCCH,1}^{(1)}$ | 1, 0 | 1, 1, 0, 0 |
| ACK, ACK, ACK, NACK/DTX | (ACK, NACK/DTX, any, any), except for (ACK, DTX, DTX, DTX) | $n_{PUCCH,1}^{(1)}$ | 1, 0 | 1, 1, 0, 0 |
| ACK, ACK, NACK/DTX, any | NACK/DTX, any, any, any | $n_{PUCCH,1}^{(1)}$ | 0, 1 | 1, 0, 0, 0 |
| ACK, ACK, NACK/DTX, any | (ACK, NACK/DTX, any, any), except for (ACK, DTX, DTX, DTX) | $n_{PUCCH,1}^{(1)}$ | 0, 1 | 1, 0, 0, 0 |
| ACK, DTX, DTX, DTX | NACK/DTX, any, any, any | $n_{PUCCH,0}^{(1)}$ | 1, 1 | 0, 1, 0, 0 |
| ACK, DTX, DTX, DTX | (ACK, NACK/DTX, any, any), except for | $n_{PUCCH,0}^{(1)}$ | 1, 1 | 0, 1, 0, 0 |

TABLE 5-continued

Mapping table when M = 4

| Serving cell#0 | Serving cell#1 | Resource | Constellation point | Coding bit input |
|---|---|---|---|---|
| ACK, ACK, ACK, ACK | (ACK, DTX, DTX, DTX) NACK/DTX, any, any, any | $n_{PUCCH,0}^{(1)}$ | 1, 1 | 0, 1, 0, 0 |
| ACK, ACK, ACK, ACK | (ACK, NACK/DTX, any, any), except for (ACK, DTX, DTX, DTX) | $n_{PUCCH,0}^{(1)}$ | 1, 1 | 0, 1, 0, 0 |
| NACK, any, any, any | NACK/DTX, any, any, any | $n_{PUCCH,0}^{(1)}$ | 0, 0 | 0, 0, 0, 0 |
| NACK, any, any, any | (ACK, NACK/DTX, any, any), except for (ACK, DTX, DTX, DTX) | $n_{PUCCH,0}^{(1)}$ | 0, 0 | 0, 0, 0, 0 |
| (ACK, NACK/DTX, any, any), except for (ACK, DTX, DTX, DTX) | NACK/DTX, any, any, any | $n_{PUCCH,0}^{(1)}$ | 0, 0 | 0, 0, 0, 0 |
| (ACK, NACK/DTX, any, any), except for (ACK, DTX, DTX, DTX) | (ACK, NACK/DTX, any, any), except for (ACK, DTX, DTX, DTX) | $n_{PUCCH,0}^{(1)}$ | 0, 0 | 0, 0, 0, 0 |
| DTX, any, any, any | NACK/DTX, any, any, any | Not transmitted | 0, 0, 0, 0 | |
| DTX, any, any, any | (ACK, NACK/DTX, any, any), except for (ACK, DTX, DTX, DTX) | Not transmitted | 0, 0, 0, 0 | |

Preferred Embodiment III

As shown in FIG. 5, it is assumed that the UE is configured to employ a PUCCH format 1b with channel selection method to send HARQ-ACK information via a PUSCH and 2 serving cells are configured, and it is assumed that a PDSCH on serving cell#0 corresponds to 1 codeword stream and a PDSCH on serving cell#1 corresponds to 2 codeword streams, and the number of downlink subframes configured for serving cell 1 is relatively large.

When it is configured to employ the bundling method of Method I, a coding input bit sequence transmitted via a PUSCH may be obtained according to the following several methods.

As regards serving cell#1, the HARQ-ACK responses corresponding to {CW#0 of subframe#n, CW#1 of subframe#n, CW#0 of subframe#m, CW#1 of subframe#m, CW#0 of subframe#p, CW#1 of subframe#p} are respectively $\{o^0_{\#1ACK}, o^1_{\#1ACK}, o^2_{\#1ACK}, o^3_{\#1ACK}, o^4_{\#1ACK}, o^5_{\#1ACK}\}$, and spatial domain bundling is performed to obtain a 3-bit ACK/NACK/DTX response {HARQ-ACK$^{\#1}$(0), HARQ-ACK$^{\#1}$(1), HARQ-ACK$^{\#1}$(2)}; as regards serving cell#0, the HARQ-ACK response corresponding to {subframe#n} is respectively $\{o^0_{\#0ACK}\}$, and spatial domain bundling is performed on $\{o^0_{\#0ACK}, o^0_{\#0ACK},$ NACK, NACK, NACK, NACK} according to a bundling method the same as that of serving cell#1 to obtain a 3-bit ACK/NACK/DTX response {HARQ-ACK$^{\#0}$(0), HARQ-ACK$^{\#0}$(1), HARQ-ACK$^{\#0}$(2)}, or to directly obtain a 3-bit ACK/NACK/DTX response pair {HARQ-ACK$^{\#0}$(0), HARQ-ACK$^{\#0}$(1), HARQ-ACK$^{\#0}$(2)}={$o^0_{\#0ACK}$, NACK, NACK}; and coding input bits o(0), o(1), o(2), o(3) are obtained from Table 7 according to the ACK/NACK/DTX response of each cell and then sent.

TABLE 6

Table of relationship between response and coding input bit

| Serving cell Y | Coding input bit |
|---|---|
| HARQ-ACK (0), HARQ-ACK (1), HARQ-ACK (2) | o(0), o(1) |
| ACK, ACK, ACK | 1, 1 |
| ACK, ACK, NACK/DTX | 1, 0 |
| ACK, NACK/DTX, any | 0, 1 |
| NACK/DTX, any, any | 0, 0 |

Or, as regards serving cell#1, the HARQ-ACK responses corresponding to {CW#0 of subframe#n, CW#1 of subframe#n, CW#0 of subframe#m, CW#1 of subframe#m, CW#0 of subframe#p, CW#1 of subframe#p} are respectively $\{o^0_{\#1ACK}, o^1_{\#1ACK}, o^2_{\#1ACK}, o^3_{\#1ACK}, o^4_{\#1ACK}, o^5_{\#1ACK}\}$, and first spatial domain bundling is performed to obtain a 3-bit ACK/NACK/DTX response, and coding input bits $o_{\#1}(0), o_{\#1}(1)$ of serving cell#1 to be transmitted via the PUSCH are obtained according to the 3-bit ACK/NACK/DTX response and Table 6, and as regards serving cell#0, the HARQ-ACK response corresponding to {subframe#n} is respectively $\{o^0_{\#0ACK}\}$, and a coding input bit $o_{\#0}(0)$ of serving cell#0 to be transmitted via the PUSCH is obtained according to the response, and the obtained coding input bit of each of the serving cells is concatenated into o(0), o(1), o(2) and then is sent.

The descriptions above are only the embodiments of the disclosure, which are not used to restrict the disclosure, for those skilled in the art, the disclosure may have various changes and variations. Any amendments, equivalent substitutions, improvements, etc. within the principle of the disclosure are all included in the scope of the protection of the disclosure. For example, the system to which the disclosure applies is not restricted to the LTE system.

It should be noted that the steps shown in the flowchart of the drawings can be executed, for example, in a computer system with a set of instructions executable by a computer, in addition, a logic order is shown in the flowchart, but the shown or described steps can be executed in a different order under some conditions.

Figure 10:
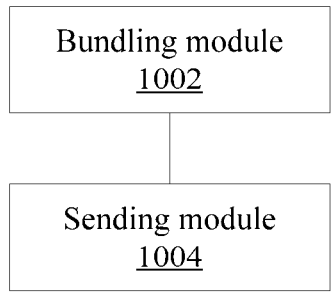
FIG. 10 is a structural block diagram of a device for sending hybrid automatic repeat request acknowledge information according to an embodiment of the disclosure.

An embodiment of the disclosure provides a device for sending hybrid automatic repeat request acknowledge information, and the device for sending hybrid automatic repeat request acknowledge information can be applied to realize the method for sending hybrid automatic repeat request acknowledge information. FIG. 10 is a structural block diagram of a device for sending hybrid automatic repeat request acknowledge information according to an embodiment of the disclosure. As shown in FIG. 10, a bundling module 1002 and a sending module 1004 are included. The structure thereof is described in details below.

A configuration 1002 is configured to, in a TDD system, in the case where a terminal is configured to employ a PUCCH format 1b with channel selection method to send HARQ-ACK information, bundle the HARQ-ACK response of downlink subframes of serving cells in a bundling window corresponding to a specified uplink subframe to obtain HARQ-ACK information to be sent by the serving cells; and a sending cell 1004 coupled to the bundling module 1002, and is configured to send the HARQ-ACK information obtained by the bundling module 1002 through bundling over the uplink subframe via a PUCCH or PUSCH.

Figure 11:
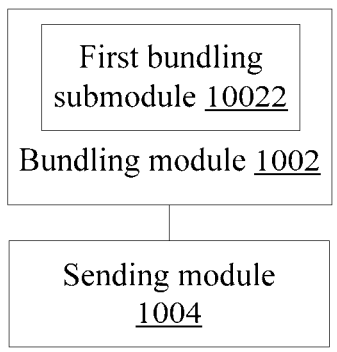
FIG. 11 is structural block diagram I of a device for sending hybrid automatic repeat request acknowledge information according to a preferred embodiment of the disclosure.
Figure 12:
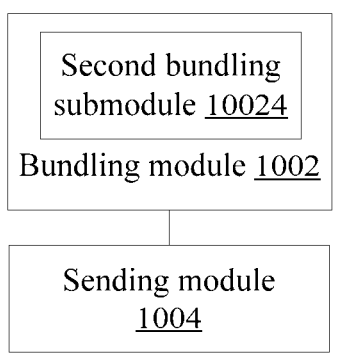
FIG. 12 is structural block diagram II of a device for sending hybrid automatic repeat request acknowledge information according to a preferred embodiment of the disclosure.

The operations executed by the bundling module 1002 include two methods, and the respective corresponding devices are as shown in FIG. 11 and FIG. 12.

FIG. 11 is structural block diagram I of a device for sending hybrid automatic repeat request acknowledge information according to a preferred embodiment of the disclosure. As shown in FIG. 11, the bundling module 1002 includes: a first bundling submodule 10022 configured to, in a TDD system, in the case where a terminal is configured to employ a PUCCH format 1b with channel selection method to send HARQ-ACK information, employ the same bundling operation to bundle the HARQ-ACK information (responses) of the downlink subframes of each of the serving cells in the bundling window to obtain HARQ-ACK information to be sent by each of the serving cells, wherein the number of bits of the HARQ-ACK information to be sent by each of the serving cells is the same.

FIG. 12 is structural block diagram II of a device for sending hybrid automatic repeat request acknowledge information according to a preferred embodiment of the disclosure. As shown in FIG. 12, the bundling module 1002 includes: a second bundling submodule 10024 configured to, in a TDD system, in the case where a terminal is configured to employ a PUCCH format 1b with channel selection method to send HARQ-ACK information, bundle, according to the number of HARQ-ACK responses of each of the serving cells, the HARQ-ACK responses of each of the serving cells respectively to obtain HARQ-ACK information to be sent by each of the serving cells.

It should be noted that the device for sending hybrid automatic repeat request acknowledge information described in the device embodiments corresponds to the method embodiments above, with the specific implementation described in the method embodiment in detail, thereby needing no further description.

To sum up, according to the embodiments of the disclosure, a method and device for sending hybrid automatic repeat request acknowledge information are provided. By way of bundling the HARQ-ACK responses of downlink subframes of serving cells in a bundling window corresponding to a specified uplink subframe, the disclosure can realize sending the HARQ-ACK information when serving cells with different uplink and downlink configurations are aggregated.

Obviously, those skilled in the art shall understand that the above-mentioned modules and steps of the disclosure can be realized by using general purpose calculating device, can be integrated in one calculating device or distributed on a network which consists of a plurality of calculating devices. Alternatively, the modules and the steps of the disclosure can be realized by using the executable program code of the calculating device. Consequently, they can be stored in the storing device and executed by the calculating device, or they are made into integrated circuit module respectively, or a plurality of modules or steps thereof are made into one integrated circuit module. In this way, the disclosure is not restricted to any particular hardware and software combination.

The descriptions above are only the preferable embodiment of the disclosure, which are not used to restrict the disclosure, for those skilled in the art, the disclosure may have various changes and variations. Any amendments, equivalent substitutions, improvements, etc. within the principle of the disclosure are all included in the scope of protection as defined in the appended claims of the disclosure.

What is claimed is:

1. A method for sending hybrid automatic repeat request acknowledge (HARQ-ACK) information, comprising:
   in a Time Division Duplex (TDD) system, configuring a terminal to employ a Physical Uplink Control Channel (PUCCH) format 1b with channel selection method to send HARQ-ACK information;
   bundling HARQ-ACK information of downlink subframes of serving cells in a bundling window corresponding to a specified uplink subframe to obtain HARQ-ACK information to be sent by the serving cells, wherein the serving cells are the aggregated cells with different uplink and downlink configurations; and
   sending the HARQ-ACK information over the uplink subframe via the PUCCH or a Physical Uplink Shard Channel (PUSCH);
   wherein sending the HARQ-ACK information via the PUCCH or the PUSCH comprises one of the following: when sending via the PUCCH, concatenating the HARQ-ACK information of the serving cells into an HARQ-ACK information sequence according to a predefined order, and then employing a PUCCH format 1b with channel selection method to send the HARQ-ACK information sequence; and when sending via the PUSCH, concatenating the HARQ-ACK information of the serving cells into an HARQ-ACK information sequence according to a predefined order, and then sending the HARQ-ACK information sequence via the PUSCH.

2. The method according to claim 1, wherein bundling the HARQ-ACK information of the downlink subframes of the serving cells in the bundling window corresponding to the specified uplink subframe to obtain the HARQ-ACK information to be sent by the serving cells comprises:
   employing a same bundling operation to bundle the HARQ-ACK information of downlink subframes of each of the serving cells in the bundling window to obtain the HARQ-ACK information to be sent by each of the serving cells, wherein the number of bits of the HARQ-ACK information to be sent by each of the serving cells is the same.

3. The method according to claim 2, wherein the number of bits is 2.

4. The method according to claim 2, wherein employing the same bundling operation to bundle the HARQ-ACK information of the downlink subframes of each of the serving cells in the bundling window comprises:
a bundling method of a serving cell with a smaller number of downlink subframes in the bundling window corresponding to the uplink subframe being the same as a bundling method of a serving cell with a larger number of downlink subframes corresponding to the uplink subframe.

5. The method according to claim 2, wherein the method for sending hybrid automatic repeat request acknowledge information is applied to a scenario where a terminal is configured to use carrier aggregation and uplink and downlink configurations of aggregated serving cells are different.

6. The method according to claim 1, wherein bundling the HARQ-ACK information of the downlink subframes of the serving cells in the bundling window corresponding to the specified uplink subframe to obtain the HARQ-ACK information to be sent by the serving cells comprises:
bundling, according to the number of pieces of HARQ-ACK information of each of the serving cells, the HARQ-ACK information of each of the serving cells respectively to obtain HARQ-ACK information to be sent by each of the serving cells.

7. The method according to claim 6, wherein bundling, according to the number of pieces of HARQ-ACK information of each of the serving cells, the HARQ-ACK information of each of the serving cells respectively to obtain the HARQ-ACK information to be sent by each of the serving cells comprises:
when the aggregated serving cells are a first serving cell and a second serving cell, the first serving cell corresponds to one downlink subframe and the second serving cell corresponds to two downlink subframes, performing spatial domain bundling on the HARQ-ACK information of the first serving cell and the second serving cell to obtain the HARQ-ACK information to be sent over the uplink subframe of the first serving cell and the second serving cell, wherein the total number of bits of the HARQ-ACK information to be sent by the first serving cell and the second serving cell is 3.

8. The method according to claim 6, wherein bundling, according to the number of pieces of HARQ-ACK information of each of the serving cells, the HARQ-ACK information of each of the serving cells respectively to obtain the HARQ-ACK information to be sent by each of the serving cells comprises:
when the aggregated serving cells are a first serving cell and a second serving cell, the first serving cell corresponds to one downlink subframe and the second serving cell corresponds to two downlink subframes, only performing spatial domain bundling on the HARQ-ACK information of the second serving cell to obtain HARQ-ACK information to be sent over the uplink subframe of the first serving cell and the second serving cell, wherein when the maximum number of transport blocks supported by a PDSCH corresponding to a downlink transmission mode of the first serving cell is 2, the total number of bits of the HARQ-ACK information to be sent by the first serving cell and the second serving cell is 4, and when the maximum number of transport blocks supported by the PDSCH corresponding to the downlink transmission mode of the first serving cell is 1, the total number of bits of the HARQ-ACK information to be sent by the first serving cell and the second serving cell is 3.

9. The method according to claim 6, wherein bundling, according to the number of pieces of HARQ-ACK information of each of the serving cells, the HARQ-ACK information of each of the serving cells respectively to obtain the HARQ-ACK information to be sent by each of the serving cells comprises:
when the aggregated serving cells are a first serving cell and a second serving cell, the first serving cell corresponds to one downlink subframe and the second serving cell corresponds to three downlink subframes, performing spatial domain bundling on the HARQ-ACK information of the first serving cell and the second serving cell to obtain HARQ-ACK information to be sent by the first serving cell and the second serving cell, wherein the total number of bits of the HARQ-ACK information to be sent by the first serving cell and the second serving cell is 4.

10. The method according to claim 6, wherein bundling, according to the number of pieces of HARQ-ACK information of each of the serving cells, the HARQ-ACK information of each of the serving cells respectively to obtain the HARQ-ACK information to be sent by each of the serving cells comprises:
when the aggregated serving cells are a first serving cell and a second serving cell, the first serving cell corresponds to one downlink subframe and the second serving cell corresponds to three downlink subframes, performing spatial domain bundling on the HARQ-ACK information of the first serving cell, and performing spatial domain bundling and then time domain bundling on the HARQ-ACK information of the second serving cell to obtain HARQ-ACK information to be sent by the first serving cell and the second serving cell, wherein the total number of bits of the HARQ-ACK information to be sent by the first serving cell and the second serving cell is 3.

11. The method according to claim 6, wherein bundling, according to the number of pieces of HARQ-ACK information of each of the serving cells, the HARQ-ACK information of each of the serving cells respectively to obtain the HARQ-ACK information to be sent by each of the serving cells comprises:
when the aggregated serving cells are a first serving cell and a second serving cell, the first serving cell corresponds to one downlink subframe and the second serving cell corresponds to three downlink subframes, only performing spatial domain bundling and then time domain bundling on the HARQ-ACK information of the second serving cell to obtain HARQ-ACK information to be sent by the first serving cell and the second serving cell, wherein when the maximum number of transport blocks supported by a PDSCH corresponding to a downlink transmission mode of the first serving cell is 2, the total number of bits of the HARQ-ACK information to be sent by the first serving cell and the second serving cell is 4, and when the maximum number of transport blocks supported by the PDSCH corresponding to the downlink transmission mode of the first serving cell is 1, the total number of bits of the HARQ-ACK information to be sent by the first serving cell and the second serving cell is 3.

12. The method according to claim 6, wherein bundling, according to the number of pieces of HARQ-ACK information of each of the serving cells, the HARQ-ACK information of each of the serving cells respectively to obtain the HARQ-ACK information to be sent by each of the serving cells comprises:

when the aggregated serving cells are a first serving cell and a second serving cell, the first serving cell corresponds to one downlink subframe and the second serving cell corresponds to four downlink subframes, only performing spatial domain bundling and then time domain bundling on the HARQ-ACK information of the second serving cell to obtain HARQ-ACK information to be sent by the first serving cell and the second serving cell, wherein the total number of bits of the HARQ-ACK information to be sent by the first serving cell and the second serving cell is 3.

13. The method according to claim 6, wherein bundling, according to the number of pieces of HARQ-ACK information of each of the serving cells, the HARQ-ACK information of each of the serving cells respectively to obtain the HARQ-ACK information to be sent by each of the serving cells comprises:

when the aggregated serving cells are a first serving cell and a second serving cell, the first serving cell corresponds to one downlink subframe and the second serving cell corresponds to four downlink subframes, only performing spatial domain bundling and then time domain bundling on the HARQ-ACK information of the second serving cell to obtain HARQ-ACK information to be sent by the first serving cell and the second serving cell, wherein when the maximum number of transport blocks supported by a PDSCH corresponding to a downlink transmission mode of the first serving cell is 2, the total number of bits of the HARQ-ACK information to be sent by the first serving cell and the second serving cell is 4, and when the maximum number of transport blocks supported by the PDSCH corresponding to the downlink transmission mode of the first serving cell is 1, the total number of bits of the HARQ-ACK information to be sent by the first serving cell and the second serving cell is 3.

14. The method according to claim 6, wherein bundling, according to the number of pieces of HARQ-ACK information of each of the serving cells, the HARQ-ACK information of each of the serving cells respectively to obtain the HARQ-ACK information to be sent by each of the serving cells comprises:

when the aggregated serving cells are a first serving cell and a second serving cell, the first serving cell corresponds to one downlink subframe and the second serving cell corresponds to four downlink subframes, performing spatial domain bundling on the HARQ-ACK information of the first serving cell, and performing spatial domain bundling and then time domain bundling on the HARQ-ACK information of the second serving cell to obtain HARQ-ACK information to be sent by the first serving cell and the second serving cell, wherein the number of bits of HARQ-ACK information to be sent after the bundling on the second serving cell is 3, wherein the number of bits of HARQ-ACK information to be sent after the bundling on the second serving cell being 3 refers to: performing spatial domain bundling on one downlink subframe of the second serving cell while performing time domain bundling on the other downlink subframes apart from the downlink subframe of the second serving cell; the total number of bits of the HARQ-ACK information to be sent by the first serving cell and the second serving cell is 4.

15. The method according to claim 6, wherein bundling, according to the number of pieces of HARQ-ACK information of each of the serving cells, the HARQ-ACK information of each of the serving cells respectively to obtain the HARQ-ACK information to be sent by each of the serving cells comprises:

when the aggregated serving cells are a first serving cell and a second serving cell, the first serving cell corresponds to one downlink subframe and the second serving cell corresponds to four downlink subframes, performing spatial domain bundling on the HARQ-ACK information of the first serving cell, and performing spatial domain bundling and then time domain bundling on the HARQ-ACK information of the second serving cell, wherein the number of bits of HARQ-ACK information to be sent after the bundling on the second serving cell is 3, the total number of bits of HARQ-ACK information to be sent by the first serving cell and the second serving cell is 4.

16. The method according to claim 6, wherein bundling, according to the number of pieces of HARQ-ACK information of each of the serving cells, the HARQ-ACK information of each of the serving cells respectively to obtain the HARQ-ACK information to be sent by each of the serving cells comprises:

when the aggregated serving cells are a first serving cell and a second serving cell, the first serving cell corresponds to two downlink subframes and the second serving cell corresponds to three downlink subframes, performing spatial domain bundling on the HARQ-ACK information of the first serving cell, and performing spatial domain bundling and then time domain bundling on the HARQ-ACK information of the second serving cell to obtain HARQ-ACK information to be sent by the first serving cell and the second serving cell, wherein the total number of bits of the HARQ-ACK information to be sent by the first serving cell and the second serving cell is 4.

17. The method according to claim 6, wherein bundling, according to the number of pieces of HARQ-ACK information of each of the serving cells, the HARQ-ACK information of each of the serving cells respectively to obtain the HARQ-ACK information to be sent by each of the serving cells comprises:

when the aggregated serving cells are a first serving cell and a second serving cell, the first serving cell corresponds to two downlink subframes and the second serving cell corresponds to four downlink subframes, performing spatial domain bundling on the HARQ-ACK information of the first serving cell, and performing spatial domain bundling and then time domain bundling on the HARQ-ACK information of the second serving cell to obtain HARQ-ACK information to be sent by the first serving cell and the second serving cell, wherein the total number of bits of the HARQ-ACK information to be sent by the first serving cell and the second serving cell is 4.

18. The method according to claim 1, wherein in the case where the maximum number of corresponding downlink subframes of the serving cell is greater than 2, the method of employing a same bundling operation to bundle the HARQ-ACK information of downlink subframes of each of the serving cells in the bundling window to obtain the HARQ-ACK information to be sent by each of the serving cells is employed, wherein the number of bits of the HARQ-ACK information to be sent by each of the serving cells is the same;

and in the case where the maximum number of corresponding downlink subframes of the serving cell is equal to 2, the method of bundling, according to the number of pieces of HARQ-ACK information of each of the serving cells, the HARQ-ACK information of each of the serving cells respectively to obtain HARQ-ACK information to be sent by each of the serving cells is employed.

19. The method according to claim 1, wherein in the case where the minimum number of corresponding downlink subframes of the serving cell is greater than 1, the method of employing a same bundling operation to bundle the HARQ-ACK information of downlink subframes of each of the serving cells in the bundling window to obtain the HARQ-ACK information to be sent by each of the serving cells is employed, wherein the number of bits of the HARQ-ACK information to be sent by each of the serving cells is the same;

and in the case where the minimum number of corresponding downlink subframes of the serving cell is equal to 1, the method of bundling, according to the number of pieces of HARQ-ACK information of each of the serving cells, the HARQ-ACK information of each of the serving cells respectively to obtain HARQ-ACK information to be sent by each of the serving cells is employed.

20. The method according to claim 1, wherein in the case where a channel used for sending the HARQ-ACK information is the PUCCH, the method of employing a same bundling operation to bundle the HARQ-ACK information of downlink subframes of each of the serving cells in the bundling window to obtain the HARQ-ACK information to be sent by each of the serving cells is employed, wherein the number of bits of the HARQ-ACK information to be sent by each of the serving cells is the same; and in the case where the channel used for sending the HARQ-ACK information is the PUSCH, the method of bundling, according to the number of pieces of HARQ-ACK information of each of the serving cells, the HARQ-ACK information of each of the serving cells respectively to obtain HARQ-ACK information to be sent by each of the serving cells is employed.

21. The method according to claim 1, wherein in the case where a channel used for sending the HARQ-ACK information is the PUCCH, the method of employing a same bundling operation to bundle the HARQ-ACK information of downlink subframes of each of the serving cells in the bundling window to obtain the HARQ-ACK information to be sent by each of the serving cells is employed, wherein the number of bits of the HARQ-ACK information to be sent by each of the serving cells is the same; in the case where the channel used for sending the HARQ-ACK information is the PUSCH and there is no corresponding DCI format 0/4, the method of employing a same bundling operation to bundle the HARQ-ACK information of downlink subframes of each of the serving cells in the bundling window to obtain the HARQ-ACK information to be sent by each of the serving cells is employed, wherein the number of bits of the HARQ-ACK information to be sent by each of the serving cells is the same; and in the case where the channel for sending the HARQ-ACK information is the PUSCH and there is a corresponding DCI format 0/4, the method of bundling, according to the number of pieces of HARQ-ACK information of each of the serving cells, the HARQ-ACK information of each of the serving cells respectively to obtain HARQ-ACK information to be sent by each of the serving cells is employed.

22. The method according to claim 1, wherein the predefined order comprises one of the following:
    an order of ascending serving cell indices; and
    an order of uplink and downlink configuration priorities of the serving cells.

23. A device for sending hybrid automatic repeat request acknowledge (HARQ-ACK) information, the device comprises a hardware processor configured to execute program units stored on a memory, the program units comprising:
    a bundling module, configured to, in a Time Division Duplex (TDD) system, in the case where a terminal is configured to employ a Physical Uplink Control Channel (PUCCH) format 1b with channel selection method to send HARQ-ACK information, bundle the HARQ-ACK information of downlink subframes of serving cells in a bundling window corresponding to a specified uplink subframe to obtain HARQ-ACK information to be sent by the serving cells, wherein the serving cells are the aggregated cells with different uplink and downlink configurations; and
    a sending module, which is connected to the bundling module, configured to send the HARQ-ACK information over an uplink subframe via the PUCCH or a Physical Uplink Shard Channel (PUSCH); wherein sending the HARQ-ACK information via the PUCCH or the PUSCH comprises one of the following: when sending via the PUCCH, concatenating the HARQ-ACK information of the serving cells into an HARQ-ACK information sequence according to a predefined order, and then employing a PUCCH format 1b with channel selection method to send the HARQ-ACK information sequence; and when sending via the PUSCH, concatenating the HARQ-ACK information of the serving cells into an HARQ-ACK information sequence according to a predefined order, and then sending the HARQ-ACK information sequence via the PUSCH.

* * * * *